United States Patent
Freestone et al.

(10) Patent No.: US 11,047,990 B2
(45) Date of Patent: Jun. 29, 2021

(54) GLOBAL NAVIGATION SATELLITE SYSTEM (GNSS) ANTENNA DATA LINK

(71) Applicant: NovAtel Inc., Calgary (CA)

(72) Inventors: Jerry Allan Freestone, Chestermere (CA); Teresia Cheuk Wa Lee, Calgary (CA); Darrell James Anklovitch, Calgary (CA)

(73) Assignee: NovAtel Inc., Calgary (CA)

( * ) Notice: Subject to any disclaimer, the term of this patent is extended or adjusted under 35 U.S.C. 154(b) by 158 days.

(21) Appl. No.: 16/197,818

(22) Filed: Nov. 21, 2018

(65) Prior Publication Data

US 2019/0324154 A1  Oct. 24, 2019

Related U.S. Application Data

(63) Continuation-in-part of application No. 15/961,263, filed on Apr. 24, 2018, now Pat. No. 10,754,044.

(51) Int. Cl.
*G01S 19/20* (2010.01)
*G01S 19/42* (2010.01)
(Continued)

(52) U.S. Cl.
CPC ............ *G01S 19/421* (2013.01); *G01S 19/20* (2013.01); *G01S 19/21* (2013.01); *G01S 19/36* (2013.01); *G01S 19/45* (2013.01)

(58) Field of Classification Search
CPC ........ G01S 19/421; G01S 19/20; G01S 19/47; G01S 19/49; G01S 19/21; G01S 19/45; G01S 19/36; G01C 21/165; G01C 21/28
(Continued)

(56) References Cited

U.S. PATENT DOCUMENTS 6,721,657 B2  4/2004  Ford et al.
6,750,816 B1  6/2004  Kunysz
(Continued)

FOREIGN PATENT DOCUMENTS

DE  102013109439 B3  11/2014
WO  2004105269 A1  12/2004
(Continued)

OTHER PUBLICATIONS

European Search Report dated Sep. 19, 2019 for EP Application No. 19170962.5 for NovAtel, Inc., 11 pages.
(Continued)

*Primary Examiner* — Harry K Liu
(74) *Attorney, Agent, or Firm* — Cesari and McKenna, LLP

(57) ABSTRACT

An antenna enclosure includes a sensor and a Global Navigation Satellite System (GNSS) antenna. Within the antenna enclosure, sensor data is combined with GNSS information to produce a RF communication signal, wherein the sensor data is out-of-band from the GNSS information. The RF communication signal is transmitted utilizing a GNSS antenna data link to a receiver side. On the receiver side, the RF communication signal is split into a GNSS RF path and a sensor RF path. The GNSS signals are transmitted to the GNSS receiver via the GNSS RF path. A sensor RF communication signal is de-modulated, and the sensor data is transmitted to the GNSS receiver. When the GNSS antenna data link is bi-directional, information may be transmitted from the GNSS receiver to the antenna enclosure via the GNSS antenna data link.

20 Claims, 13 Drawing Sheets

(51) Int. Cl.
*G01S 19/21* (2010.01)
*G01S 19/36* (2010.01)
*G01S 19/45* (2010.01)

(58) Field of Classification Search
USPC .................................................. 342/357.3
See application file for complete search history.

(56) References Cited

U.S. PATENT DOCUMENTS

| | | | |
|---|---|---|---|
| 7,212,921 | B2 | 5/2007 | Jeerage et al. |
| 7,268,727 | B2 | 9/2007 | Montgomery et al. |
| 7,671,791 | B2 | 3/2010 | Feller |
| 7,804,887 | B2 | 9/2010 | Page |
| 8,547,276 | B2 | 10/2013 | Cole et al. |
| 10,088,576 | B2 | 10/2018 | Vasilyuk et al. |
| 2002/0169578 | A1 | 11/2002 | Yang |
| 2004/0236509 | A1 | 11/2004 | Jeerage |
| 2005/0242991 | A1 | 11/2005 | Montgomery et al. |
| 2011/0241939 | A1* | 10/2011 | Maenpa .............. G01S 19/23 342/368 |
| 2013/0241768 | A1* | 9/2013 | Petersen ............. G01S 19/36 342/357.27 |
| 2014/0148214 | A1 | 5/2014 | Sasson |
| 2015/0226856 | A1 | 8/2015 | Zarowski et al. |
| 2018/0224557 | A1 | 8/2018 | McMilin et al. |
| 2020/0049833 | A1 | 2/2020 | Drummer et al. |

FOREIGN PATENT DOCUMENTS

| | | |
|---|---|---|
| WO | 2016085554 A2 | 6/2016 |
| WO | 2017188836 | 11/2017 |

OTHER PUBLICATIONS

Mark Stevens et al., "Military GPS Receivers for Naval Use", GEC—Plessey Avionics, Martin Road, West Leigh, Havant, Hamshire, UK, 1990, pp. 65-70.

NovAtel: "The Difference Between Life and Death is about 290mm—Compact GPS Anti-Jam Technology for Military Land Vehicles", GAJT Brochure, May 2012, www.novatel.com/GAJT, Nov. 2019.

NovAtel: "Defense GAJT-AE-N—GPS Anti-Jam Technology (GAJT) Antenna Electronics for Smaller Platforms", Brochure, www.novateLcom/GAJT, Nov. 2019.

Lockheed Martin "Gstar Anti-Jam GPS—Electronic Protection" Brochure 2018.

McMilin et al., "Field Test Validation of Single-Element Antenna with Anti-Jam and Spoof Detection", Proceedings of the 28th International Technical Meeting of the Ion Satellite Division, ION GNSS+2015, Tampa, FL, Sep. 14-18, 2015.

* cited by examiner

GLOBAL NAVIGATION SATELLITE SYSTEM (GNSS) ANTENNA DATA LINK

CROSS-REFERENCE TO RELATED APPLICATIONS

The present application is a continuation-in-part of commonly assigned copending U.S. patent application Ser. No. 15/961,263, which was filed on Apr. 24, 2018, by Darrell James Anklovitch for GLOBAL NAVIGATION SATELLITE SYSTEM (GNSS) ANTENNA DATA LINK, which is hereby incorporated by reference.

BACKGROUND

Technical Field

The invention relates generally to Global Navigation Satellite System (GNSS) systems, and more particularly, to a GNSS antenna data link that transmits sensor data and GNSS information from an antenna enclosure to a GNSS receiver.

Background Information

Global navigation satellite system (GNSS) and inertial navigation system (INS) integration is used for certain navigation and remote sensing applications that utilize position, velocity, and/or orientation information. The INS combines sensor data from sensors that make up an inertial measurement unit (IMU) with GNSS information from GNSS signals received at the GNSS receiver to compute position, velocity, and/or attitude. A 3-dimensional vector between the GNSS antenna and the IMU is known as a "lever arm," and the lengths of the vector in the x, y, and z dimensions are referred to as "lever arm values." Accurate lever arm values are crucial such that the INS can correctly integrate the sensor data and the GNSS information to produce accurate position, velocity, and/or attitude.

With prior art systems, the IMU is typically mounted at a location in close proximity to the GNSS receiver while the GNSS antenna is typically mounted at a location where there is a clear view of the sky such that the GNSS signals are readily received. For example, the GNSS antenna is typically mounted on the outside of a vehicle, such as on the roof of a car or an exterior of a ship, while the IMU is typically mounted in close proximity to the GNSS receiver that is located inside of the vehicle.

With the prior art systems, the user has to manually determine and enter the lever arm values into the GNSS/INS system. In addition, if the GNSS antenna and/or the IMU are moved to a different location, the lever arm values have to be recalculated by the user and re-entered into the GNSS/INS system by the user. Accordingly, such prior art systems are prone to user error, and if the user incorrectly determines the lever arm values and/or incorrectly enters the lever arm values into the GNSS/INS system, the INS will produce inaccurate position, velocity, and/or attitude.

Further, and as known by those skilled in the art, IMU errors (e.g., angular errors) may result in a loss of accuracy to the sensor data. As such, the loss of accuracy is magnified as the distance between the GNSS antenna and IMU increases, i.e., the lever arm values increase. As such, smaller lever arm values are desired.

Furthermore, the lever arm values may be more susceptible to changes as the distance between the GNSS antenna and IMU increases. Specifically, a GNSS antenna mounted at one end of a ship and an IMU mounted at the other end of the ship may experience different motion due to the sea, for example. In this scenario, the lever arm values may constantly be changing, which in turn would result in the INS producing inaccurate position, velocity and/or attitude. Therefore, reducing the distance between the GNSS antenna and IMU is desirable to ensure that the GNSS antenna and IMU experience the same motion, which in turn increases the likelihood that the lever arm values remain constant.

In addition, certain existing antenna structures do not include IMU capability and/or other sensor capability. If a user wants to update the antenna structure to include the IMU capability, the other sensor capability, or transmit additional data (e.g., serial data from an anti-jamming antenna), the user typically needs to add extra cabling, extra communication lines, and/or additional hardware to support the inclusion of the IMU and/or other sensor. Adding such components can be costly to the user.

Thus, what is needed is a system and method that overcomes the above mentioned problems.

SUMMARY

The inventive system and method utilizes a Global Navigation Satellite System (GNSS) antenna data link to transmit sensor data and GNSS information from an antenna enclosure to a GNSS receiver. Specifically, a GNSS antenna within the antenna enclosure receives one or more GNSS signals containing GNSS information from one or more GNSS satellites. In addition, a sensor, e.g., an inertial measurement unit (IMU) sensor, within the antenna enclosure produces sensor data. If the sensor data is in an analog format, an analog-to-digital converter may be utilized to convert the sensor data to a digital format. The sensor data may then be transmitted to an antenna side controller. A radio frequency (RF) modulator/de-modulator of the antenna side controller may modulate the sensor data onto a RF communication signal to produce a sensor RF communication signal. A combiner combines the sensor RF communication signal containing the sensor data with the GNSS signals containing the GNSS information to produce a single RF communication signal, wherein the sensor RF communication signal is out-of-band from the GNSS signals.

The single RF communication signal is transmitted from the antenna enclosure to the receiver side utilizing the GNSS antenna data link which, for example, may be a single coaxial cable. The GNSS antenna data link may be unidirectional from the antenna enclosure to the receiver side or bi-directional. On the receiver side, a splitter is utilized to split the single RF communication signal into a GNSS RF path and a sensor RF path. A GNSS split RF signal containing the GNSS information is transmitted to the GNSS receiver via the GNSS RF path.

A sensor split RF signal containing the sensor data is transmitted to a receiver side controller via the sensor RF path. A RF modulator/de-modulator of the receiver side controller de-modulates the sensor data from the sensor split RF signal and the sensor data is transmitted to the GNSS receiver utilizing a protocol associated with a communication port at the GNSS receiver. The GNSS receiver may then utilize the GNSS information and the sensor data in a known manner. For example, the GNSS receiver may utilize the GNSS information to compute position and/or an INS filter (e.g., Kalman filter) within the GNSS receiver may utilize the lever arm values, associated with the GNSS antenna and the sensor mounted in the same antenna enclosure, to integrate the sensor data and the GNSS information to produce accurate position, velocity, and/or attitude.

In an embodiment and when the GNSS antenna data link is bi-directional, the GNSS receiver may transmit information (e.g., request information, configuration information, and/or time information) to the antenna enclosure via the sensor RF path. The time information may be utilized, for example, by the antenna side controller to synchronize a sensor clock with GNSS time to accurately time-stamp the sensor data. In addition or alternatively, the request information may be utilized to request particular information from the antenna enclosure and/or the configuration information may be utilized to instruct a device within the antenna enclosure to perform one or more functions.

Advantageously, and since the sensor and the GNSS antenna are within the same antenna enclosure, movement of the antenna enclosure does not cause the lever arm values to change. That is, the lever arm values remain constant since the positional relationship between the GNSS antenna and the sensor within the antenna enclosure remains constant. Thus, the lever arm values associated with the GNSS antenna and the sensor only have to be calculated once. For example, if a manufacturer builds the antenna enclosure that includes the GNSS antenna and the sensor, the lever arm values may be determined once during the manufacturing process and then provided to the GNSS/INS system. As such, a user does not have to calculate and/or repeatedly calculate the lever arm values. In addition, a loss in accuracy of the sensor data, due to IMU errors, is not magnified since the GNSS antenna and sensor are in close proximity to each other within the antenna enclosure.

Moreover, if a user chooses to upgrade an existing antenna structure to include IMU capability and/or other sensor capability, extra cabling, extra communication lines, and/or additional hardware are not required since the IMU capability and/or other sensors can be added to the antenna enclosure and the single GNSS antenna data link can be utilized to transmit the sensor data with the GNSS information to the GNSS receiver.

In an embodiment, the single GNSS antenna data link is utilized to transmit data between two different subsystems. For example, the first subsystem may be an anti-jamming antenna subsystem attached to the exterior of a vehicle and the second subsystem may be a Power Injector/Data Converter (PIDC) located inside the vehicle. In addition, first data and second data may be combined onto a single RF communication signal and transmitted between the two subsystems. The first data may be the GNSS information and the second data may be serial data obtained by the first subsystem. For example, the serial data may include, but is not limited to, direction information associated with one or more jammers, received jammer power levels, status/health information indicating whether the anti-jamming antenna subsystem is being jammed or negatively affected, number of nulls being directed towards the one or more jammers, etc.

An RF modulator/de-modulator of the first subsystem may modulate the second data onto a RF communication signal to produce a serial RF communication signal associated with a selected frequency (e.g., 2.4 GHz). A splitter/combiner of the first subsystem combines the serial RF communication signal containing the second data with the GNSS signals containing the first data (GNSS information) to produce a single RF communication signal.

The single RF communication signal is transmitted from the first subsystem to the second subsystem utilizing the GNSS antenna data link, which may be a unidirectional or a bi-directional link having a coaxial cable that couples the first subsystem to the second subsystem through, for example, the armor or skin of a vehicle. A splitter/combiner of the second subsystem splits the single RF communication signal into a GNSS RF path and a serial RF path. A GNSS split RF signal containing the first information (e.g., GNSS information) is transmitted over one or more wired or wireless networks (not shown) to a third subsystem, such as a GNSS receiver, that is external to the second subsystem. A serial split RF signal containing the second data (e.g., serial data) is transmitted to a RF modulator/de-modulator of the second subsystem to demodulate the second data from the serial split RF signal. The second data is then transmitted over the one or more wired or wireless networks (not shown) to a fourth subsystem, such as a personal computer (PC) or a user display/control system, which is external to the second subsystem and the third subsystem.

In addition, one or more requests or configuration commands may be transmitted to the first subsystem utilizing the GNSS antenna data link. For example, the fourth subsystem, e.g., the PC or the user display control system, may transmit request information indicating when the second data, i.e., serial data, should be transmitted to the fourth subsystem. In addition or alternatively, the third and fourth subsystems may communicate over the one or more wired or wireless networks (not shown). For example, the third subsystem may transmit the position of the first subsystem, determined from the GNSS information, to the fourth subsystem. The fourth subsystem may then display, on a computer display associated with the fourth subsystem, the position of the first subsystem relative to the position of the jammer determined from the received second data. Thus, an existing single GNSS antenna data link (e.g., coaxial cable) between the first subsystem and the second subsystem that is utilized to transmit GNSS information between the two subsystems may also be utilized to transmit additional different data (e.g., serial data) between the two subsystems. Advantageously, additional holes do not need to be drilled in the armor or skin of the vehicle to accommodate additional cables that would otherwise be required to transmit the additional data between the two subsystems.

BRIEF DESCRIPTION OF THE DRAWINGS

The description below refers to the accompanying drawings, of which.

DETAILED DESCRIPTION OF AN ILLUSTRATIVE EMBODIMENT

Figure 1A:
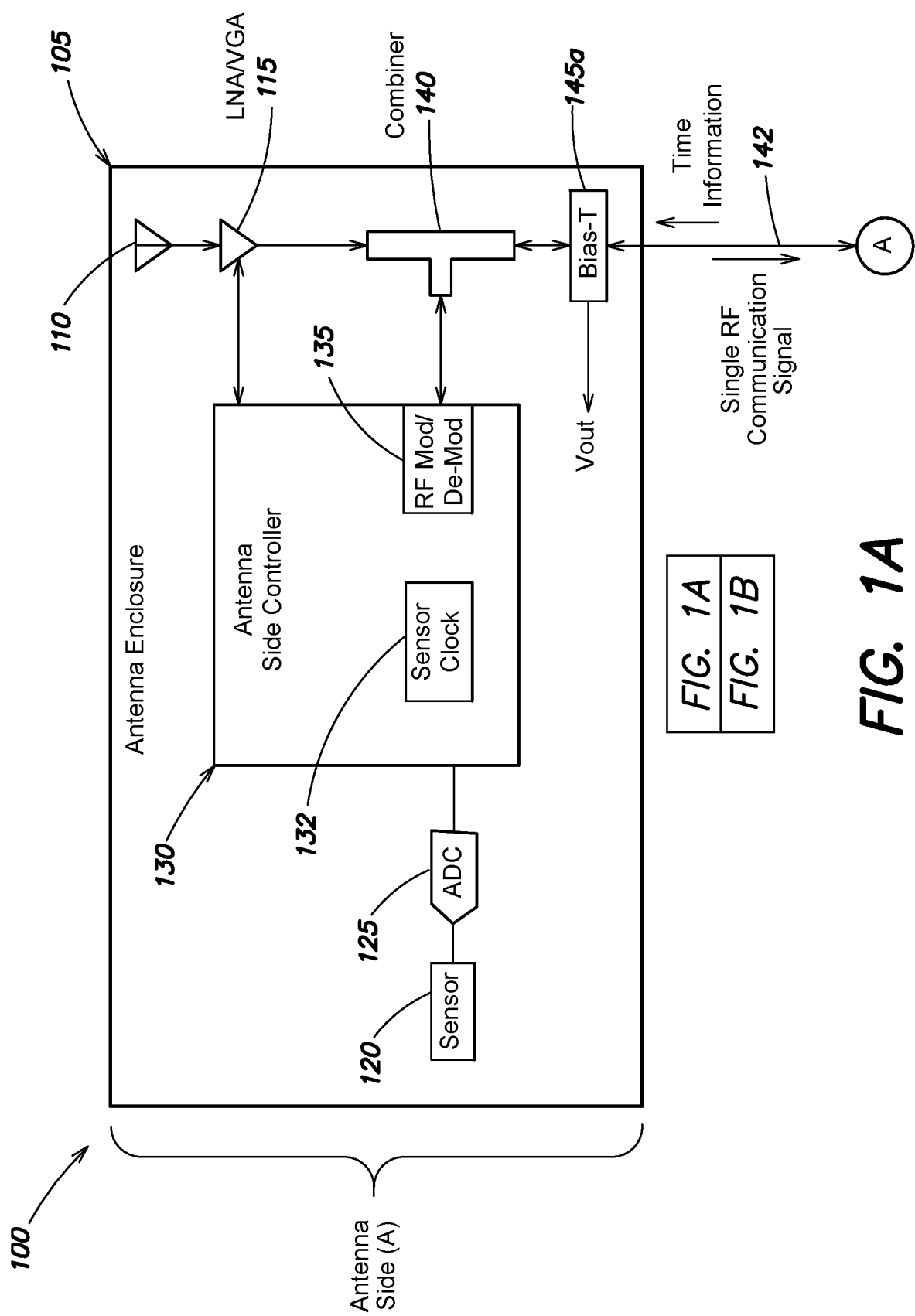
FIGS. 1A and 1B depict a system in accordance with an illustrative embodiment of the invention.
Figure 1B:
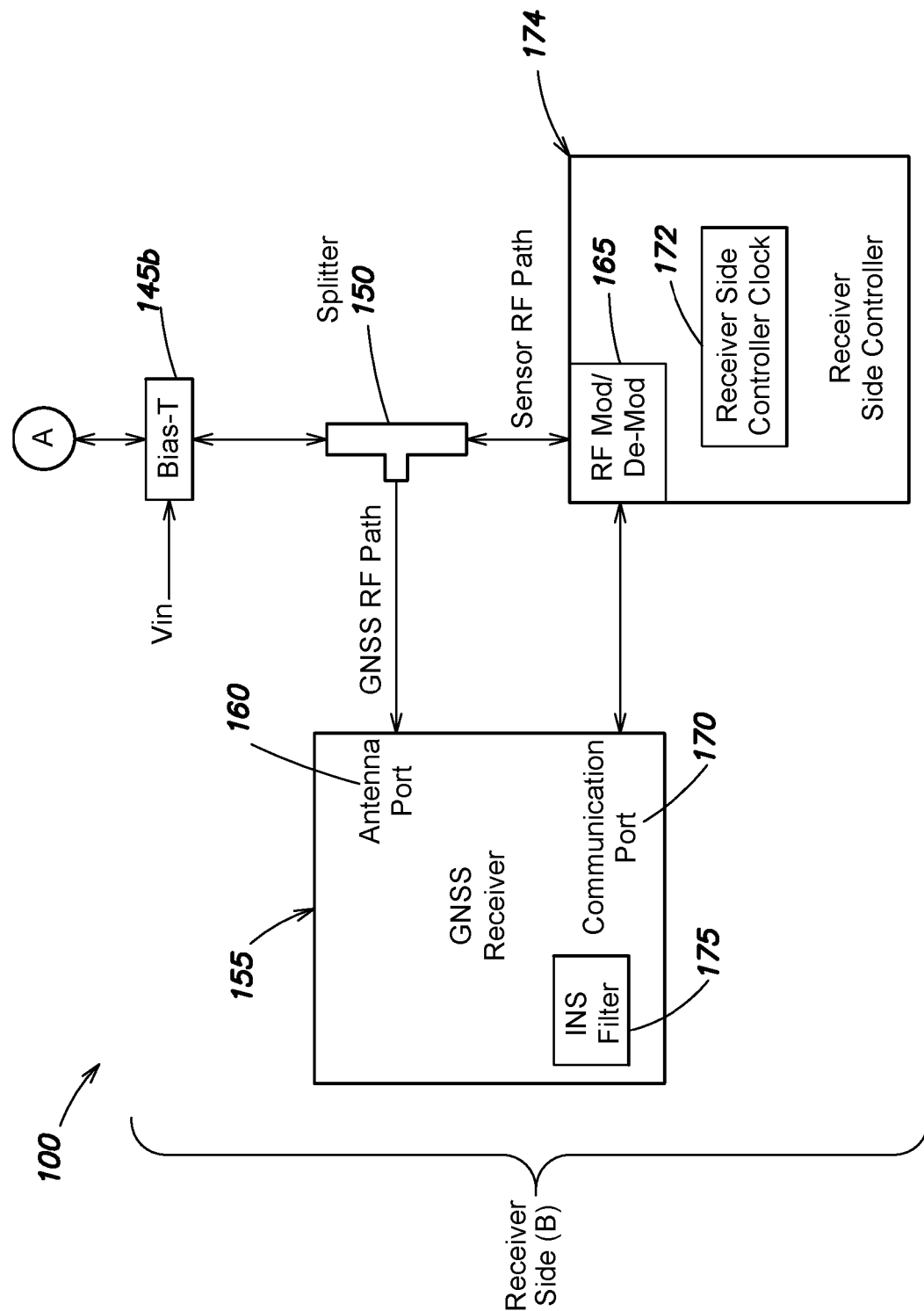

Referring to FIGS. 1A and 1B, a system 100, e.g., a Global Navigation Satellite System (GNSS)/Inertial Navigation System (INS) system, includes an antenna side (A) and a receiver side (B). The antenna side (A) of the system 100 includes an antenna enclosure 105. The antenna enclosure 105 includes a GNSS antenna 110 configured to receive one or more GNSS signals from one or more GNSS satellites, wherein the one or more GNSS signals contain GNSS information. For example, the one or more GNSS signals may utilize one or more different radio frequencies (RFs) associated with different bands, such as, but not limited to, L1, L2, and L5 bands (e.g., 1176-1610 MHz). A low noise amplifier (LNA)/variable gain amplifier (VGA) 115 may be utilized to modify the one or more GNSS signals (e.g., amplify and/or adjust the gains), as known by those skilled in the art.

In addition, the antenna enclosure 105 includes a sensor 120 that is mounted at a particular fixed position within the antenna enclosure 105 and configured to produce sensor data. For example, the sensor may be an inertial measurement unit (IMU) sensor, such as, but not limited to an accelerometer, a gyroscope, or a magnetometer. Alternatively, the sensor may be a ranging radio, a pressure sensor (e.g., barometer), a camera, a Light Detection and Ranging (LIDAR) sensor, or any other type of sensor. The 3-dimensional vector between the sensor 120 and the GNSS antenna 110 is known as a "lever arm," and the lengths of the vector in the x, y, and z dimensions are referred to as "lever arm values." The lever arm values may be determined and provided to a GNSS receiver 155 utilizing a graphical user interface or any of a variety of different mechanisms/techniques, as known by those skilled in the art.

In an embodiment, and when the sensor data produced by the sensor 120 is in an analog format, an analog-to-digital converter (ADC) 125, within the antenna enclosure 105, may convert the sensor data to a digital format. An antenna side controller 130, within the antenna enclosure 105, receives the digital sensor data. For example, the antenna side controller 130 receives the digital sensor data from the sensor 120 when the sensor 120 produces the sensor data in a digital format or receives the digital sensor data from the analog-to-digital converter 125 when analog sensor data is converted to the digital format.

The antenna side controller 130 includes at least a sensor clock 132 and an RF modulator/de-modulator 135. The sensor clock 132 of the antenna side controller 130 may be synchronized with GNSS time, as described in further detail below. In addition, the antenna side controller 130 may utilize the sensor clock 132 to time-tag the sensor data. The RF modulator/de-modulator 135 modulates the sensor data, which may or may not be time-tagged, onto a RF communication signal to produce a sensor RF communication signal that utilizes a RF frequency that is different than the RF frequency utilized by the one or more GNSS signals (e.g., 1176-1610 MHz). For example, the RF modulator/de-modulator 130 may modulate the digital sensor data utilizing a frequency associated with the industrial, scientific, and medical radio band (ISM band) (e.g., 915 MHz) to produce the sensor RF communication signal. As such, the sensor RF communication signal containing the sensor data is out-of-band from the one or more GNSS signals containing the GNSS information.

A combiner 140, within the antenna enclosure 105, receives the one or more GNSS signals containing the GNSS information from the LNA/VGA 115 and also receives the sensor RF communication signal containing the sensor data from the antenna side controller 130. The combiner 140 combines the one or more GNSS signals containing the GNSS information (in band) with the sensor RF communication signal containing the sensor data (out-of-band) to produce a single RF communication signal.

The single RF communication signal, containing the GNSS information and the sensor data, travels through a bias-T 145a and over the GNSS antenna data link 142 to the receiver side (B). For example, the GNSS antenna data link 142 may be a single coaxial cable. In addition, the GNSS antenna data link 142 may be unidirectional from the antenna enclosure 105 to the receiver side (B) or bi-directional. On the receiver side (B), the single RF communication signal travels through bias-T 145b to splitter 150 that splits the single RF communication signal into a GNSS RF path and a sensor RF path. It is noted that the two bias-Ts, 145a and 145b, are utilized to provide DC power ($V_{IN}$) to the components within the antenna enclosure 105 ($V_{OUT}$) while ensuring that the DC power does not pass through to the GNSS receiver 155, as known by those skilled in the art.

The GNSS RF path carries a GNSS split RF signal containing the GNSS information from the splitter 150 to the GNSS receiver 155 via an antenna port 160. The GNSS receiver 155 may utilize the GNSS information from the GNSS split RF signal to compute position, for example.

The sensor RF path carries a sensor split RF signal containing the sensor data from the splitter 150 to a receiver side controller 174. The receive side controller 174 includes a receiver side controller clock 172 and a RF modulator/de-modulator 165. The receiver side controller clock 172 may transmit time information to the antenna enclosure 105 to synchronize the sensor clock 132 with GNSS time, as will be described in further detail below. The RF modulator/de-modulator 165 of the receiver side controller 174 de-modulates the sensor data from the sensor split RF signal. The receiver side controller 174 may format the sensor data according to a protocol utilized to transmit the sensor data as packets to the GNSS receiver 155 via a communication port 170.

For example, if the communication port is a Universal Serial Bus (USB) port, the receiver side controller 174 may format the sensor data into one or more packets according to a protocol associated with the USB port. The GNSS receiver 155 may then utilize the sensor data. For example, an INS filter 175 (e.g., Kalman filter) of the GNSS receiver 155 may utilize the provided lever arm values, associated with the GNSS antenna 110 and the sensor 120 mounted in the same antenna enclosure, to integrate the sensor data with the GNSS information to accurately compute position, velocity, and/or attitude.

Advantageously, and since the sensor 120 and the GNSS antenna 110 are within the same antenna enclosure 105, movement of the antenna enclosure 105 does not cause the lever arm values to change. That is, the lever arm values remain constant since the positional relationship between the GNSS antenna 110 and the sensor 120 within the antenna enclosure 105 remains constant. Thus, the lever arm values associated with the GNSS antenna 110 and the sensor 120 only have to be calculated once. In addition, a loss in accuracy of the sensor data, due to IMU errors, is not magnified since the GNSS antenna 110 and the sensor 120 are in close proximity to each other within the antenna enclosure 105.

In an embodiment, and when the GNSS antenna data link 142 is bi-directional, the GNSS receiver 155 may transmit information (e.g., request information, configuration information, and/or time information) to the antenna enclosure 105 via the sensor RF path.

For example, time information may be transmitted to the antenna enclosure 105 such that the antenna side controller 130 can synchronize the sensor clock 132 with GNSS time. Specifically, the receiver side controller 174 may utilize time messages (e.g., variable frequency (VARF) signals) and pulse per second (PPS) signals received from the GNSS receiver 155 via the communication port 170 to synchronize the receiver side controller clock 172 with GNSS time, as known by those skilled in the art. The time information, associated with the synchronized receiver side controller clock 172, may be included in one or more acknowledgement messages that are then transmitted to the antenna enclosure 105 utilizing the bi-directional GNSS antenna data link 142.

Specifically and in response to receiving the sensor data from the antenna enclosure 105, the receiver side controller 174 may record the received time (i.e., receiver-side timestamp) utilizing the synchronized receiver side controller clock 172 and send the one or more acknowledgment messages, with the receiver-side timestamp, to the antenna enclosure 105 via the sensor RF path confirming receipt of the sensor data. More specifically, the receiver-side timestamp (i.e., time information) and acknowledgment data may be modulated by the RF modulator/de-modulator 165 to produce one or more RF acknowledgment messages that are transmitted through the splitter 150 and bias-T 145b, and over the bi-directional GNSS antenna data link 142 to the antenna enclosure 105.

At the antenna enclosure 105, the RF acknowledgment messages are transmitted through the bias-T 145a and the combiner 140 to the antenna side controller 130. The RF modulator/de-modulator 135 de-modulates the time information and acknowledgment data from the RF acknowledgment messages. The antenna side controller 130 may then utilize the time information to synchronize the sensor clock 132 with the GNSS time. Advantageously, the now synchronized sensor clock 132 can be utilized by the antenna side controller 130 to accurately time-tag the sensor data.

In addition or alternatively, the GNSS receiver 155 may send one or more requests, via the sensor RF path and utilizing the bi-directional GNSS antenna data link 142, for the lever arm values, a status of the antenna 110, a model identifier of the antenna 110, a serial number of the antenna 110, and/or a phase center of the antenna 110, etc. For example and in response to receiving a request for the lever arms values from the GNSS receiver 155 via the bi-directional GNSS antenna data link 142, the antenna enclosure 105 may provide the lever arm values to the GNSS receiver 155 as described above.

In addition or alternatively, the GNSS receiver 155 may send one or more configuration commands, via the sensor RF path and utilizing the bi-directional GNSS antenna data link 142, to instruct a device within the antenna enclosure 105 to perform one or more functions. For example, such configuration commands may include, but are not limited to, VGA adjustment, sensor RF signal gain adjustment, control sensor operation (e.g., filtering, sample rates, and/or measurement modes), and/or turning on/off particular antenna elements.

Specifically, the requests and/or configuration commands may be transmitted via communication port 170 to the receiver side controller 174. The RF modulator/de-modulator 165 may modulate the request information in the requests and/or the configuration information in the configuration commands to produce one or more RF request messages and/or one or more RF configuration messages. The one or more RF request messages and/or the one or more RF communication messages are transmitted through the splitter 150 and bias-T 145b, and over the bi-directional GNSS antenna data link 142 to the antenna enclosure 105.

At the antenna enclosure 105, the RF request messages and/or RF configuration messages are transmitted through the bias-T 145a and the combiner 140 to the antenna side controller 130. The RF modulator/de-modulator 135 demodulates the request information and/or configuration information from the RF request messages and/or RF configuration messages. The antenna side controller 130 may then utilize the request information to send particular information (e.g., lever arm values, a status of the antenna 110, a model identifier of the antenna 110, a serial number of the antenna 110, and/or a phase center of the antenna 110, etc.) to the GNSS receiver 155 via the sensor RF path and utilizing the bi-directional GNSS antenna data link 142, as described above. The particular information may then be utilized at the GNSS receiver 155 to integrate the sensor data and the GNSS information to produce accurate position, velocity, and/or attitude.

In addition or alternatively, the antenna side controller 130 may utilize the configuration information to perform one or more functions at the antenna side (A). For example, the antenna 110 may turn on or turn off particular antenna elements based on the configuration information.

Figure 2A:
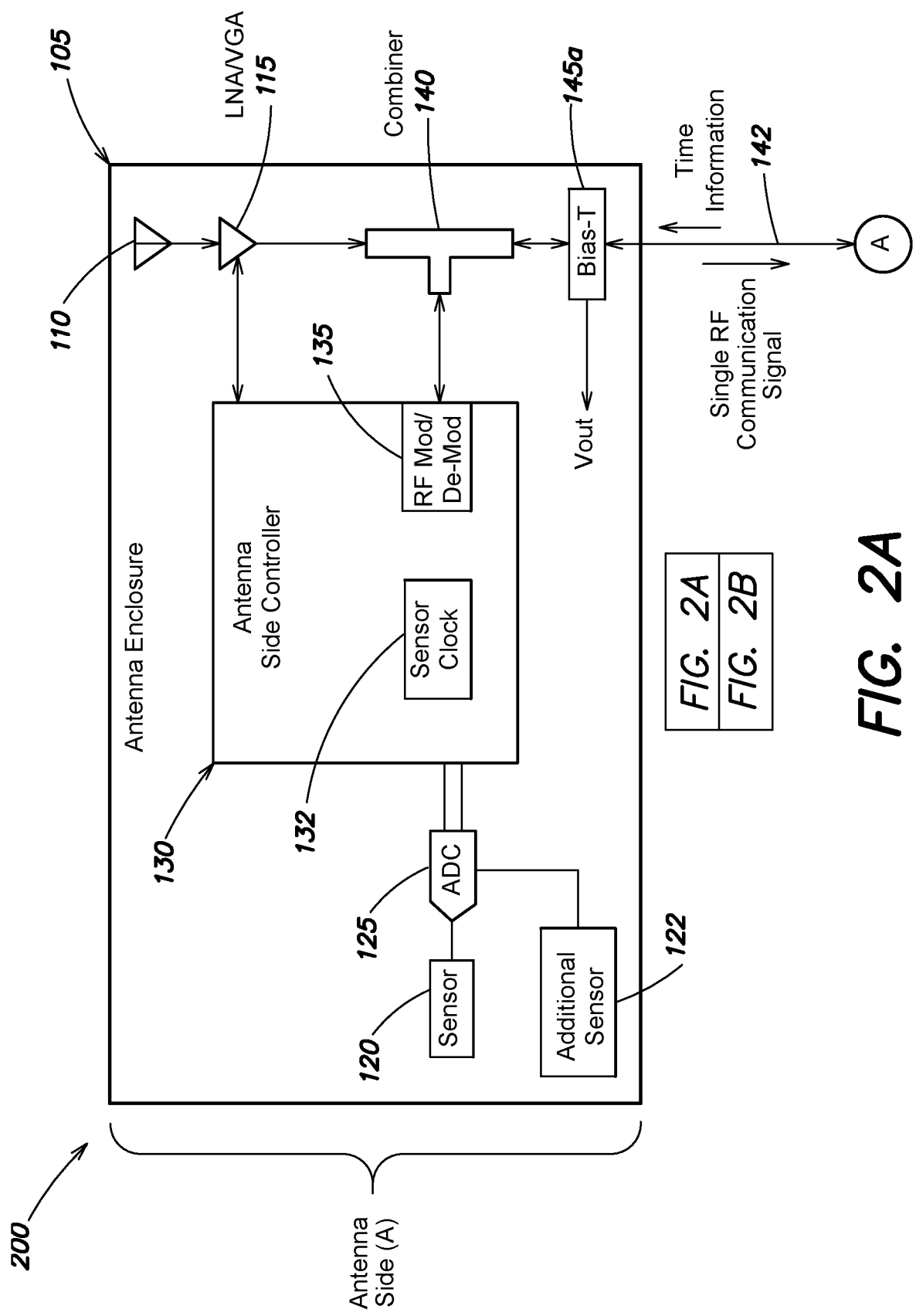
FIGS. 2A and 2B depict a system with a plurality of sensors in accordance with an illustrative embodiment of the invention.
Figure 2B:
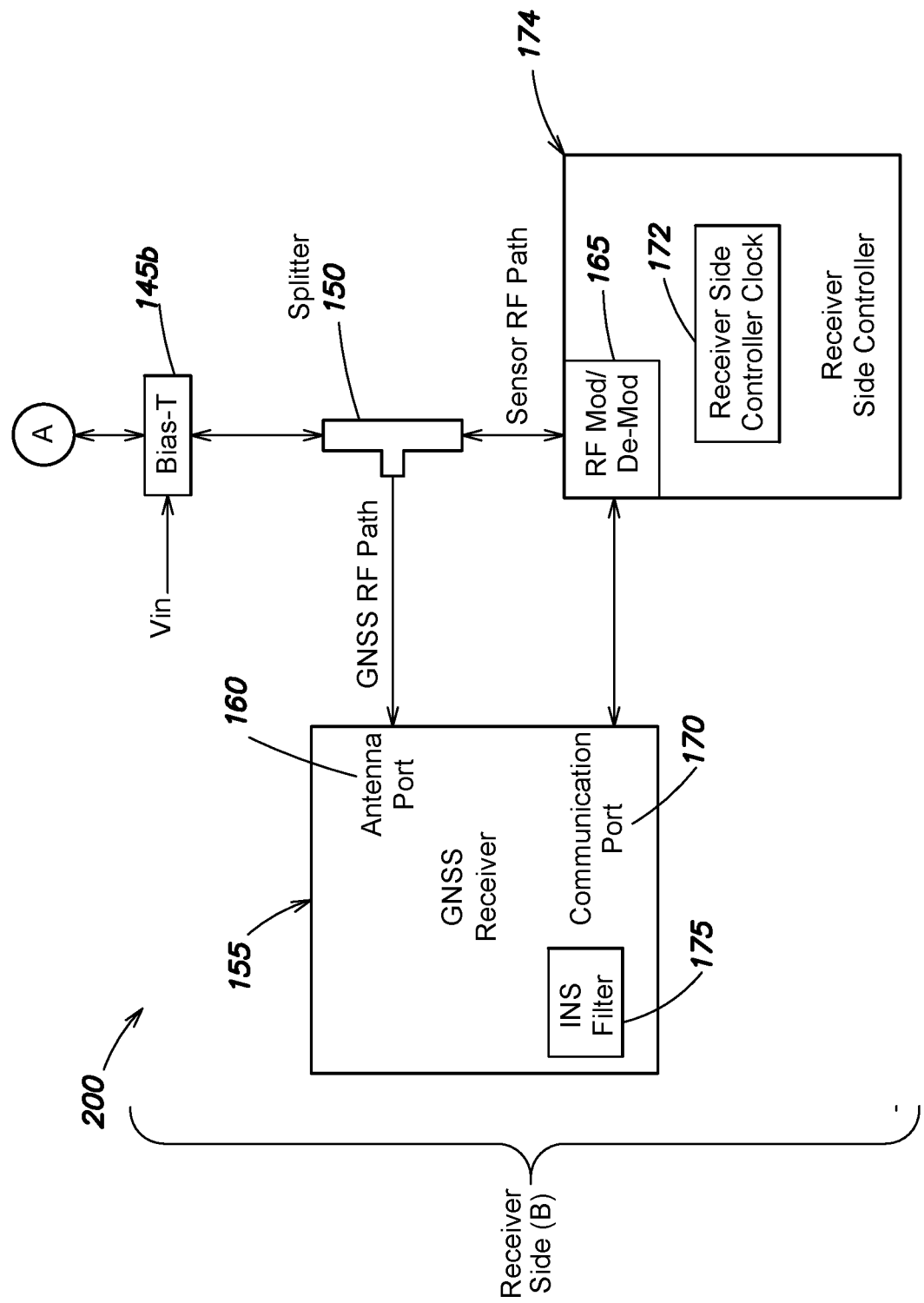

Referring to FIGS. 2A and 2B, a system 200, e.g., a GNSS/INS system, includes an antenna side (A) and a receiver side (B), wherein the antenna side (A) includes an antenna enclosure 105 with plurality of sensors. Specifically, the antenna enclosure 105 includes the Global Navigation Satellite System (GNSS) antenna 110 configured to receive one or more GNSS signals from one or more GNSS satellites.

In addition, the antenna enclosure 105 includes the sensor 120 that is mounted at the particular fixed position within the antenna enclosure 105 and configured to produce sensor data. Further, the antenna enclosure 105 includes an additional sensor 122 that is mounted at a different fixed position within the antenna enclosure 105 and configured to produce additional sensor data. For example, a user may desire to add the additional sensor 122 to the antenna enclosure 105 to expand the capability of the system 200. As such, the lever arm values associated with the additional sensor (e.g., the 3-dimensional vector between the additional sensor 122 and the GNSS antenna 110) may be determined and provided to the GNSS receiver 155 utilizing a graphical user interface or any of a variety of different mechanisms/techniques, as known by those skilled in the art.

To accommodate the additional sensor 122, the ADC 125 and RF modulator/de-modulator 135 may contain a plurality of inputs and/or outputs. Alternatively, an additional ADC (not shown) may be included in the antenna enclosure 105 and/or an additional RF modulator/de-modulator (not shown) may be included within the controller 130 to accommodate the additional sensor 122. As such, the additional sensor data from the additional sensor 122 can be converted to a digital format and modulated onto an additional RF communication signal to produce an additional sensor RF communication signal.

The combiner 140 may then combine the one or more GNSS signals containing the GNSS information, the sensor RF communication signal containing the sensor data, and the additional sensor RF communication signal containing the additional sensor data to produce the single RF communication signal. That is, the sensor RF communication signal and the additional RF communication signal are out-of-band from the GNSS signals. For example, the GNSS signals containing the GNSS information may utilize a RF frequency associated with the L1, L2, L5 bands (e.g., between 1176-1610 MHz). In addition, the sensor RF communication signal containing the sensor data and the additional sensor RF communication signal containing the addition sensor data may utilize a frequency associated with the ISM band (e.g., 915 MHz). Although reference is made to the sensor RF communication signal and the additional sensor RF communication signal utilizing the same frequency, it is expressly contemplated that the additional sensor RF communication signal may utilize a frequency that is separate and distinct from the sensor RF communication signal and the GNSS signals.

The single RF communication signal (containing the GNSS information, the sensor data, and the additional sensor data) is transmitted to the receiver side (B) utilizing the GNSS antenna data link 142. Specifically, the single RF communication signal (containing the GNSS information, the sensor data, and additional sensor data) is transmitted through bias-T 145a, over the GNSS antenna data link 142, through the bias-T 145b, and to the splitter 150. The splitter 150 then splits the single RF communication signal into the GNSS RF path and the sensor RF path.

The GNSS path and sensor RF path operate in the manner described above with reference to FIGS. 1A and 1B for the GNSS split RF signal and the sensor split RF signal. In addition, the sensor RF path carries an additional sensor split RF signal containing the additional sensor data from the splitter 150 to the receiver side controller 174. The RF modulator/de-modulator 165 of the receiver side controller 174 de-modulates the additional sensor data from the additional sensor split RF signal. The controller may format the additional sensor data according to a protocol utilized to transmit the additional sensor data as packets to the GNSS receiver 155 via the communication port 170.

Advantageously, and since the additional sensor 122 and the GNSS antenna 110 are within the same antenna enclosure 105, movement of the antenna enclosure 105 does not cause the lever arm values to change. That is, the lever arm values for the additional sensor 122 also remain constant since the positional relationship between the GNSS antenna 110 and the additional sensor 122 within the antenna enclosure 105 remains constant. In addition, a loss in accuracy of the additional sensor data, due to IMU errors, is not magnified since the GNSS antenna 110 and the additional sensor 122 are in close proximity to each other within the antenna enclosure 105.

It is noted that the sensor clock 132, which may be synchronized as described above, can be used for the additional sensor 122 and the additional sensor data may be accurately time-tagged utilizing the synchronized sensor clock 132.

Figure 3:
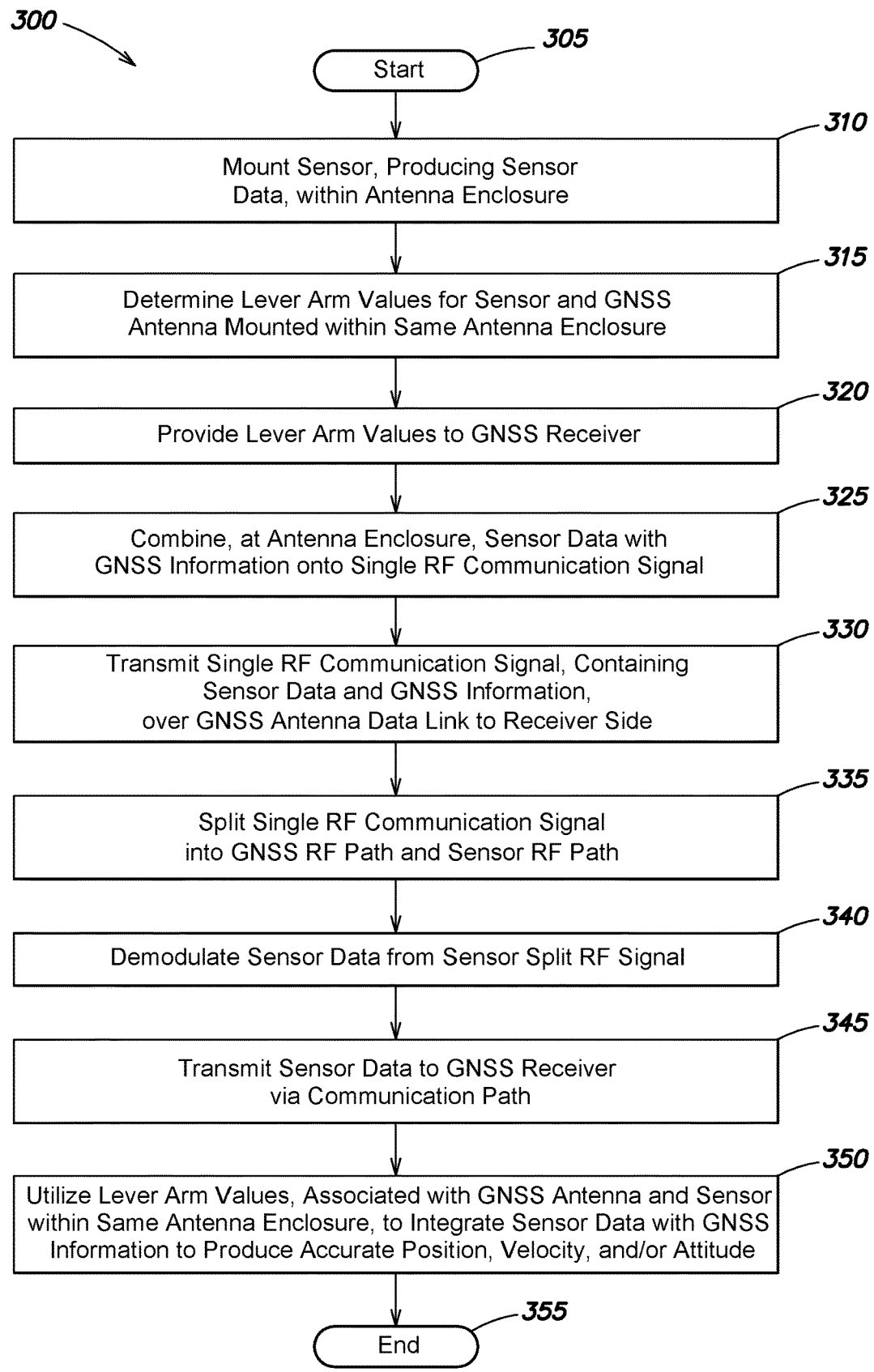
FIG. 3 is an exemplary flow chart for utilizing a single Global Navigation Satellite System (GNSS) antenna data link to transmit sensor data and GNSS information from an antenna enclosure to a GNSS receiver in accordance with an illustrative embodiment of the invention.

FIG. 3 is an exemplary flow chart for utilizing a GNSS antenna data link to transmit sensor data and GNSS information from an antenna enclosure to a GNSS receiver in accordance with an illustrative embodiment of the invention. The procedure 300 starts at step 305 and continues to step 310 where a sensor 120, that produces sensor data, is mounted within an antenna enclosure 105. For example, the sensor 120 may be an inertial measurement unit (IMU) sensor, such as, but not limited to an accelerometer, a gyroscope, or a magnetometer. Alternatively, the sensor may be a ranging radio, a pressure sensor (e.g., barometer), a camera, a LIDAR sensor, or any other type of sensor. In addition, the antenna enclosure 105 includes a GNSS antenna 110 configured to receive one or more GNSS signals that contain GNSS information. Further, the sensor data may be converted from an analog format to a digital format utilizing an ADC 125 and the sensor data may be time-tagged by the controller 130 utilizing the sensor clock 132 that was synchronized with GNSS time as described above.

The procedure continues to step 315 where the lever arm values are determined for the sensor and GNSS antenna mounted within the same antenna enclosure. Since the sensor 120 is mounted at a fixed position within the antenna enclosure 105, the lever arm values remain constant even if the antenna enclosure 105 is moved. In addition, a loss in accuracy of the sensor data, due to errors, is not magnified since the GNSS antenna 110 and sensor 120 are in close proximity to each other within the antenna enclosure 105.

The procedure continues to step 320 where the lever arm values are provided to the GNSS receiver. For example, a graphical user interface or any of variety of different mechanisms/techniques may be utilized to provide the lever arm values to the GNSS receiver 155.

The procedure continues to step 325 where the antenna enclosure combines the sensor data with the GNSS information onto a single RF communication signal, wherein the sensor data is out-of-band from the GNSS information. Specifically, the sensor data may be modulated onto a RF communication signal by the RF modulator/de-modulator 135 to produce a sensor RF communication signal. The sensor RF communication signal containing the sensor data may then be combined, utilizing the combiner 140, with the GNSS signals containing the GNSS information to produce the single RF communication signal, wherein the sensor RF communication signal is out-of-band-from the GNSS signals.

It is noted that if a plurality of sensors are utilized, a sensor RF communication signal for each sensor is combined with the GNSS signals to produce the single RF communication signal, wherein the GNSS signals utilize a different frequency than the sensor RF communication signals. For example if there are two sensors within the antenna enclosure, the GNSS signals containing the GNSS information may utilize a RF frequency associated with the L1, L2, L5 bands (e.g., between 1176-1610 MHz) and a sensor RF communication signal containing the sensor data and an additional sensor RF communication containing the additional sensor data may utilize a frequency associated with the ISM band (e.g., 915 MHz).

The procedure continues to step 330 where the single RF communication signal, containing the sensor data and the GNSS information, is transmitted over the GNSS antenna data link to the receiver side. For example, the GNSS antenna data link 142 may be a single coaxial cable. Specifically, the single RF communication signal is transmitted through the bias-T 145*a*, over the GNSS antenna data link 142, through the bias-T 145*b*, and to the splitter 150 on the receiver side (B). The procedure continues to step 335 where a splitter 150 on the receiver side splits the single RF communication signal into a GNSS RF path and a sensor RF path.

Specifically, the GNSS RF path carries a GNSS split RF signal containing the GNSS information from the splitter 150 to the antenna port 160 of the GNSS receiver 155 that may use the GNSS information in a known manner. For example, the GNSS receiver 155 may utilize the GNSS information to compute position. The sensor RF path carries a sensor split RF signal containing the sensor data from the splitter 150 to the receiver side controller 174.

The procedure continues to step 340 where the sensor data is demodulated from the sensor split RF signal. Specifically, the RF modulator/de-modulator 165 of the receiver side controller 174 demodulates the sensor data from the sensor split RF signal. The receiver side controller 174 may format the sensor data into one or more packets according to a protocol associated with a communication port 170 of the GNSS receiver 155.

The procedure continues to step 345 where the sensor data is transmitted to the GNSS receiver via the communication port. The procedure continues to step 350 and the lever arm values, associated with the GNSS antenna and the sensor mounted in the same antenna enclosure, are utilized to integrate the sensor data with the GNSS information to produce accurate position, velocity, and/or attitude. Specifically, the INS filter 175 of the GNSS receiver 155 may utilize the lever arm values, associated with the GNSS antenna 110 and the sensor 120 mounted in the same antenna enclosure 105, to integrate the sensor data with the GNSS information to produce accurate position, velocity, and/or attitude.

Advantageously, and since the sensor 120 and the GNSS antenna 110 are within the same antenna enclosure 105, movement of the antenna enclosure 105 does not cause the lever arm values to change. That is, the lever arm values remain constant since the positional relationship between the GNSS antenna 110 and the sensor 120 within the antenna enclosure 105 remains constant. In addition, a loss in accuracy of the sensor data, due to IMU errors, is not magnified since the GNSS antenna 110 and the sensor 120 are in close proximity to each other within the antenna enclosure 105. The procedure ends at step 355.

Figure 4:
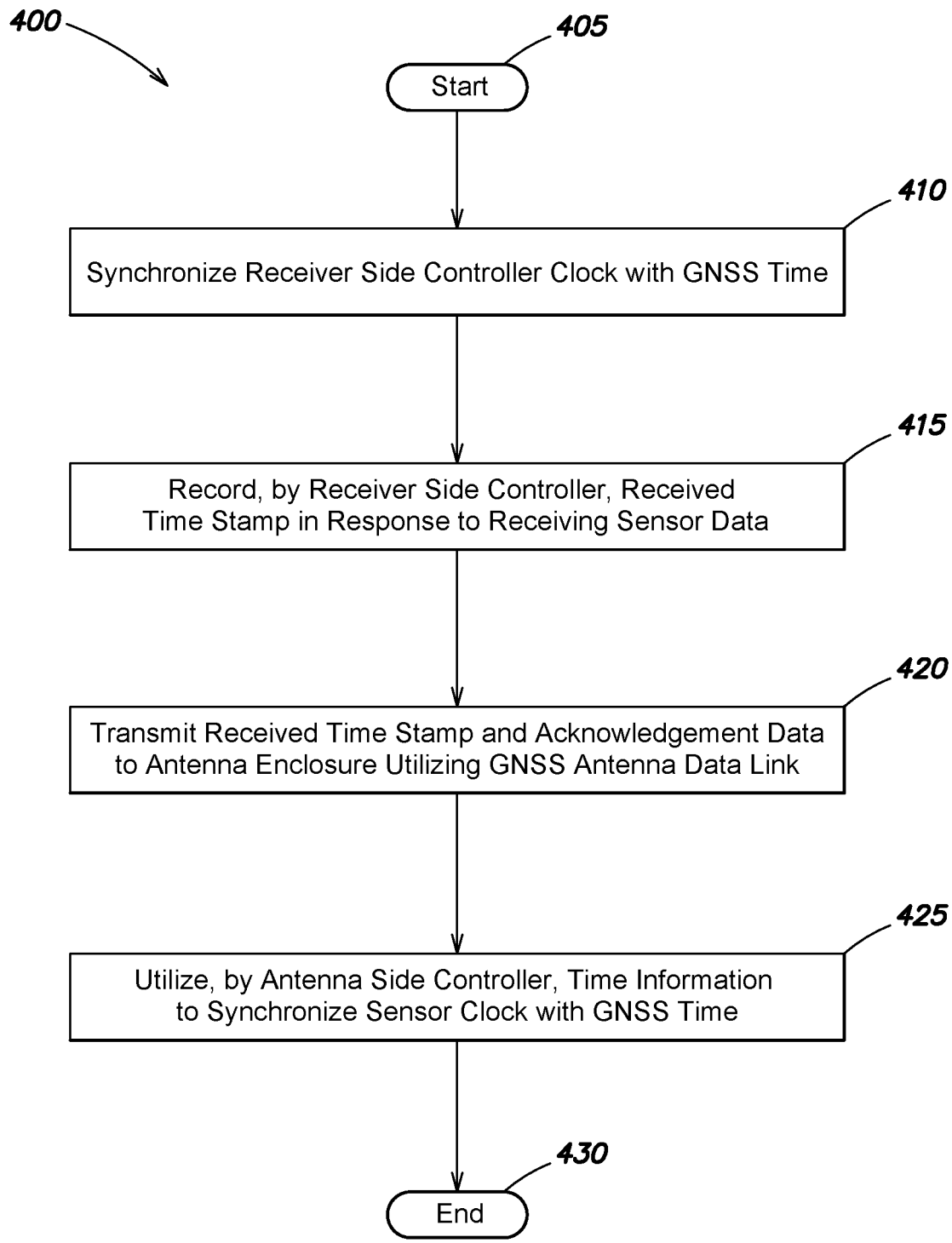
FIG. 4 is an exemplary flow chart for transmitting time information from the GNSS receiver to the antenna enclosure when the GNSS antenna data link is bi-directional in accordance with an illustrative embodiment of the invention.

FIG. 4 is an exemplary flow chart for transmitting time information from the GNSS receiver to the antenna enclosure when the GNSS antenna data link is bi-directional in accordance with an illustrative embodiment of the invention. The procedure 400 starts at step 405 and continues to step 410 where the receiver side controller synchronizes the receiver side controller clock with GNSS time. For example, the receiver side controller 174 may receive variable frequency (VARF) signals and pulse per second (PPS) signals from the GNSS receiver 155 via the communication port 170. The VARF signal (e.g., a 5 MHz VARF signal) may then be utilized to steer the receiver side controller clock 172 to the GNSS time and the PPS signals may be utilized to subsequently synchronize the receiver side controller clock 172, as known by those skilled in the art.

The procedure continues to step 415 where the receiver side controller records a received time stamp, in response to receiving the sensor data from the antenna enclosure, utilizing the receiver side controller clock 172 synchronized with the GNSS time. The procedure continues to step 420 where the received time stamp (i.e., time information) and acknowledgment data are transmitted to the antenna enclosure utilizing the GNSS antenna data link 142. Specifically, the RF modulator/de-modulator 165 modulates the time information and acknowledgment data to produce one or more RF acknowledgment messages that are transmitted through the splitter 150 and bias-T 145*b* and over the bi-directional GNSS antenna data link 142 to the antenna enclosure 105.

The procedure continues to step 425 where the antenna side controller utilizes the time information to synchronize the sensor clock with GNSS time. Specifically and at the antenna enclosure 105, the RF acknowledgment messages are transmitted through the bias-T 145*a* and combiner 140 to the antenna side controller 130. The RF modulator/de-modulator 135 de-modulates the time information and acknowledgment data from the RF acknowledgment messages. The antenna side controller 130 may then utilize the time information to synchronize the sensor clock 132 with the GNSS time.

Advantageously, the now synchronized sensor clock 132 can be utilized by the antenna side controller 130 to accurately time-tag the sensor data. The procedure then ends at step 430.

Figure 5:
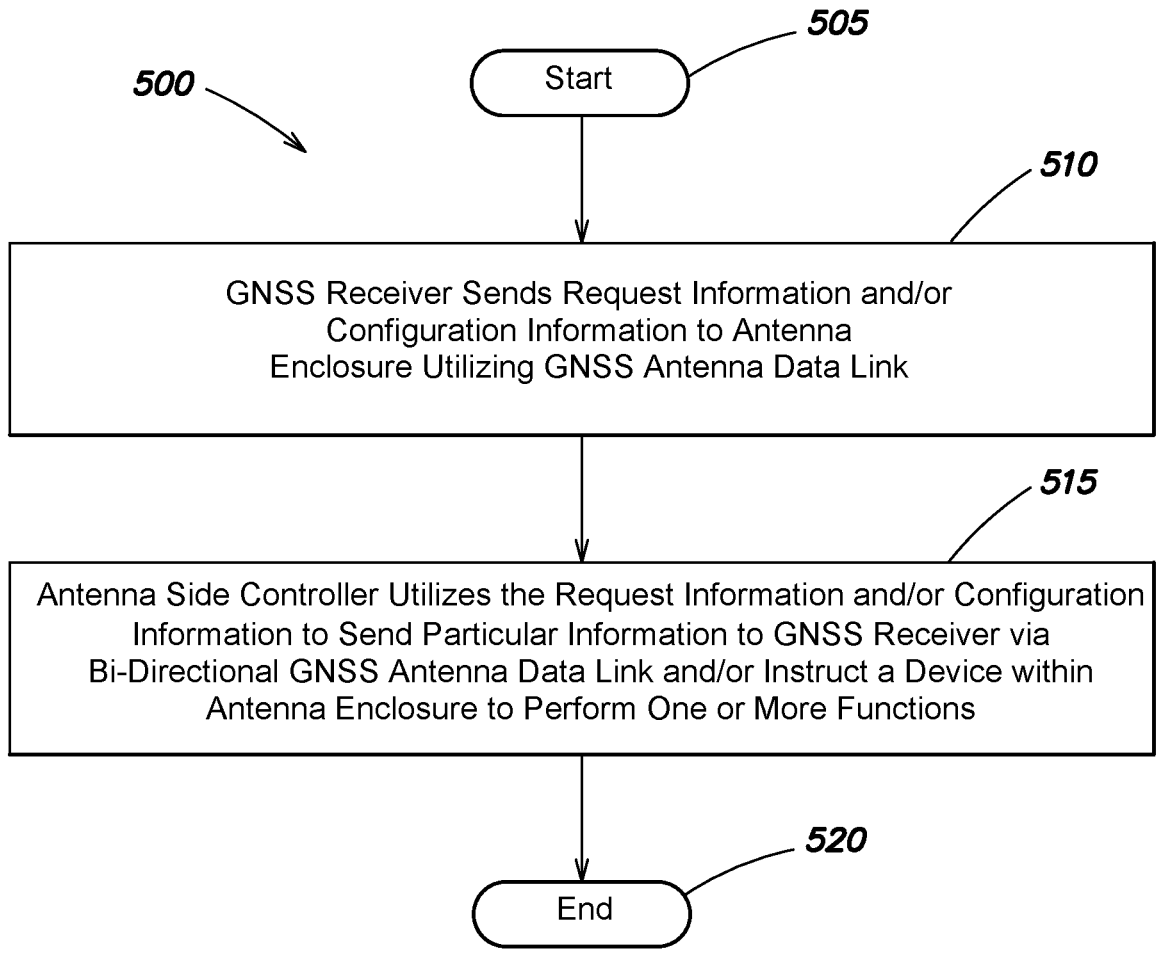
FIG. 5 is an exemplary flow chart for transmitting request information and/or configuration information from the GNSS receiver to the antenna enclosure when the GNSS antenna data link is bi-directional in accordance with an illustrative embodiment of the invention.

FIG. 5 is an exemplary flow chart for transmitting request information and/or configuration information from the GNSS receiver to the antenna enclosure when the GNSS antenna data link is bi-directional in accordance with an illustrative embodiment of the invention. The procedure 500 starts at step 505 and continues to step 510 where the GNSS receiver sends request information and/or configuration information to the antenna enclosure utilizing the bi-directional GNSS antenna data link.

Specifically, one or more requests may be for the lever arm values, a status of the antenna 110, a model identifier of the antenna 110, a serial number of the antenna 110, and/or a phase center of the antenna 110, etc. One or more configuration commands may instruct a device within the antenna enclosure 105 to perform one or more particular functions. For example, such configuration commands may include, but are not limited to, VGA adjustment, sensor RF signal gain adjustment, control sensor operation (e.g., filtering, sample rates, and/or measurement modes), and/or turning on/off particular antenna elements.

More specifically, the requests and/or configuration commands are transmitted from the GNSS receiver 155 to the receiver side controller 174 via the communication port 170. The RF modulator/de-modulator 165 modulates the request information in the requests and/or configuration information in the configuration commands to produce one or more RF request messages and/or one or more RF configuration messages. The one or more RF request messages and the one or more RF configuration messages are transmitted via the sensor RF path through the splitter 150 and bias-T 145*b* over the bi-directional GNSS antenna data link 142 to the antenna enclosure 105.

The procedure continues to step 515 where the antenna side controller utilizes the request information and/or the configuration information to send particular information to the GNSS receiver via the bi-directional GNSS antenna data link and/or instruct a device within the antenna enclosure to perform one or more functions. Specifically and at the antenna enclosure 105, the RF request messages and/or RF configuration messages are transmitted through the bias-T 145*a* and combiner 140 to the antenna side controller 130. The RF modulator/de-modulator 135 demodulates the request information and/or configuration information from the RF request messages and/or RF configuration messages. The antenna side controller 130 may then utilize the request information and/or configuration information.

For example and based on the request information, the antenna side controller 130 may send the lever arm values, a status of the antenna 110, a model identifier of the antenna 110, a serial number of the antenna, and/or a phase center of the antenna 110, etc., via the bi-directional GNSS antenna data link 142. Specifically, and in response to receiving a request for the lever arms values from the GNSS receiver 155 via the bi-directional GNSS antenna data link 142, the antenna enclosure 105 may provide the lever arm values to the GNSS receiver 155 as described above with reference to FIG. 3.

The particular information may then be utilized by the GNSS receiver 155 to integrate the sensor data and the GNSS information to produce accurate position, velocity, and/or attitude.

In addition or alternatively, and based on the configuration information, the antenna side controller 130 may cause a device within the antenna enclosure 105 to perform a particular function. For example, the antenna side controller 130 may cause the antenna 110 to turn on or turn off particular antenna elements. The procedure then ends at step 520.

Figure 6A:
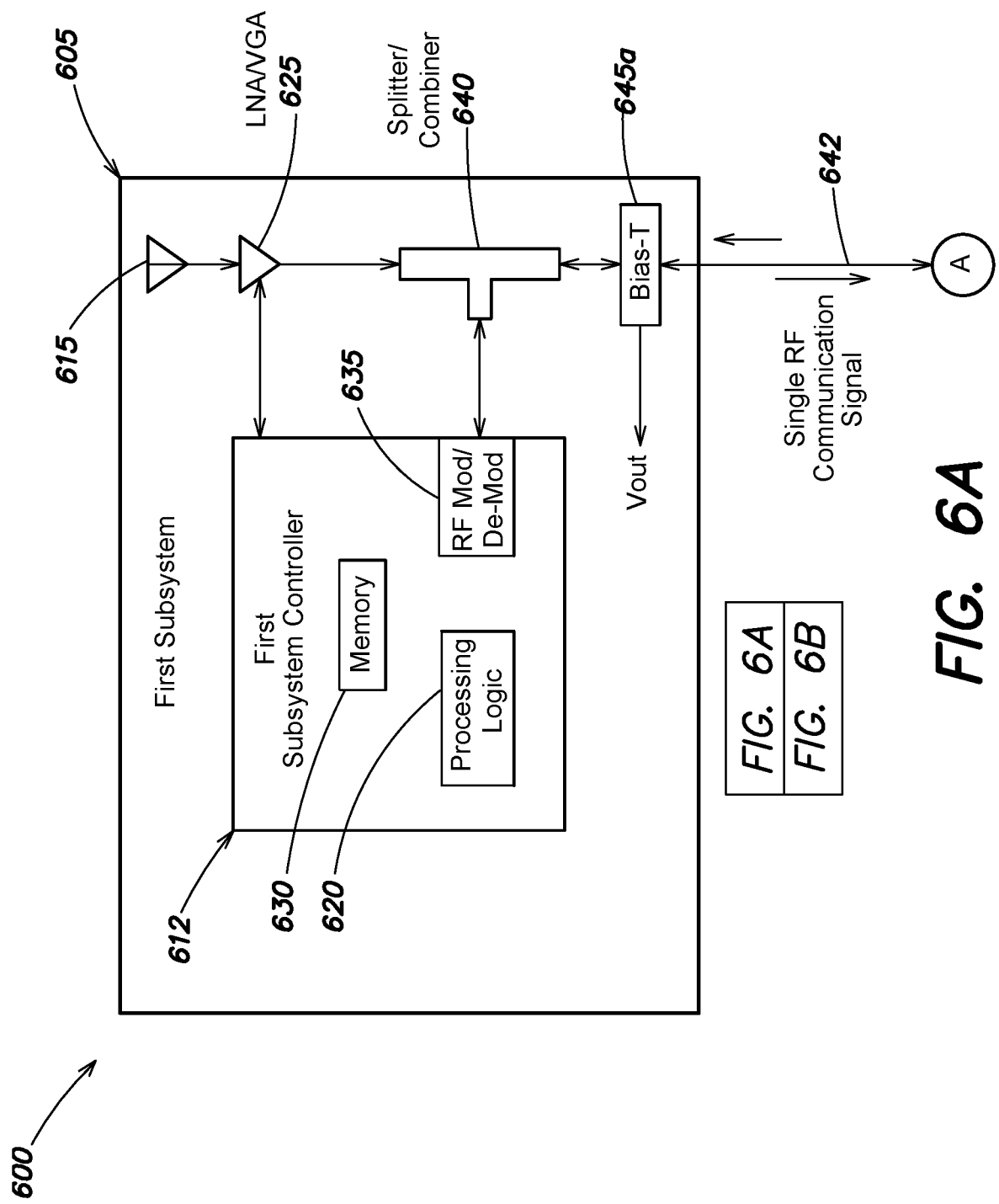
FIGS. 6A and 6B depict a system with the GNSS antenna data link that is utilized to transmit GNSS information and serial data between two subsystems in accordance with an illustrative embodiment of the invention.
Figure 6B:
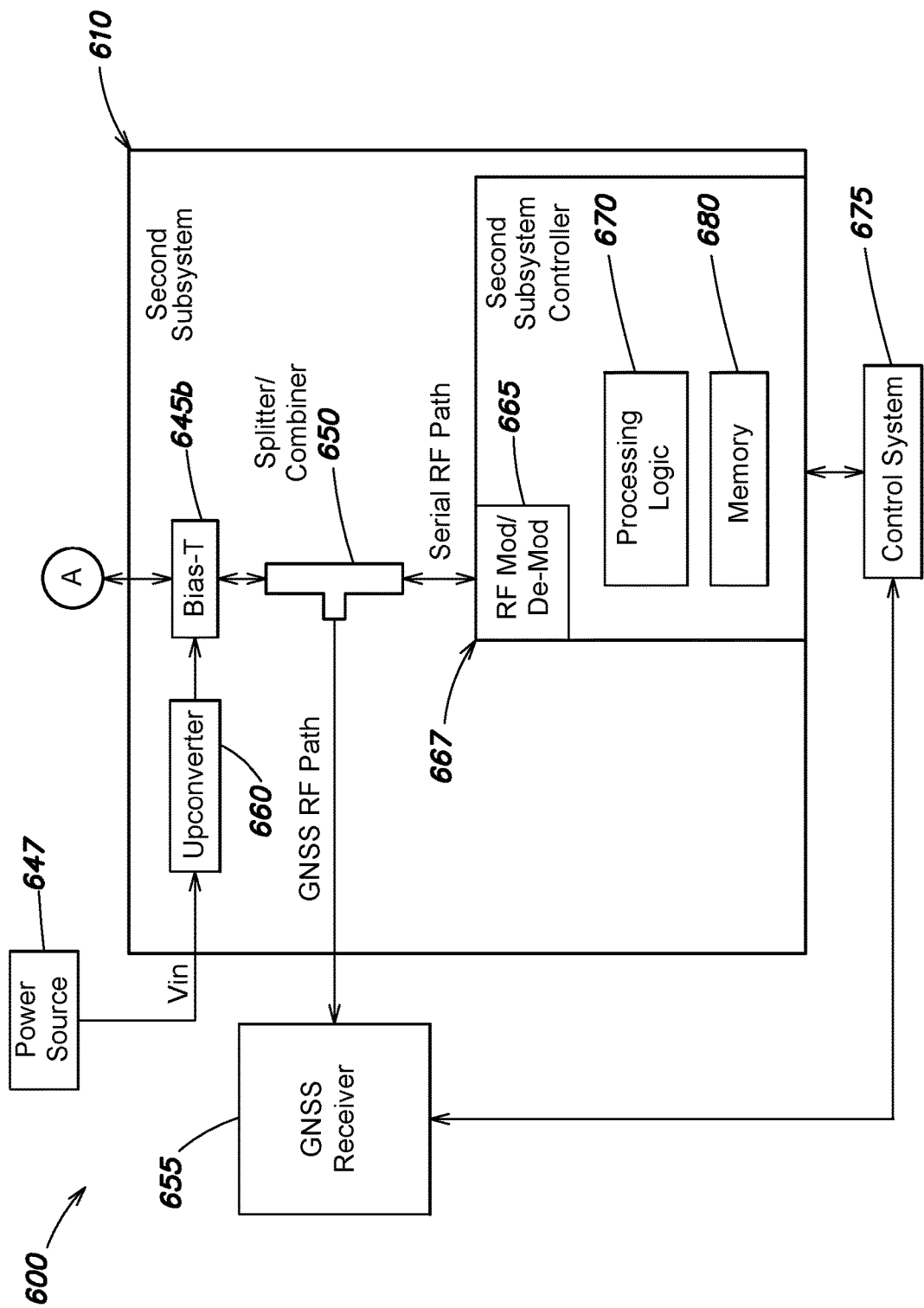

Referring to FIGS. 6A and 6B, a system 600 includes a first subsystem 605 and a second subsystem 610. The first subsystem 605 may be an anti-jamming antenna subsystem that includes a GNSS antenna 615 having one or more elements configured to mitigate interferences and receive one or more GNSS signals from one or more GNSS satellites, wherein the one or more GNSS signals contain GNSS information. For example, the first subsystem 605 may be a Controlled Reception Pattern Antenna (CRPA) subsystem, an adaptive antenna subsystem, a null-steering antenna subsystem, and/or a beamforming antenna subsystem that mitigates intentional or unintentional interfering signals from one or more jamming sources (i.e., jammers).

Specifically, the first subsystem 605 may mitigate interferences by creating nulls in the direction of the one or more jammers. Alternatively, the first subsystem 605 may utilize any of a variety of different mitigation techniques, as know by those skilled in the art, to protect against interferences such that first subsystem 605 may operate to obtain the GNSS information from GNSS signal received at the antenna 615. The one or more GNSS signals may utilize one or more different frequencies associated with different bands, such as, but not limited to, L1, L2, and L5 bands (e.g., 1176-1610 MHz). A low noise amplifier (LNA)/variable gain amplifier (VGA) 625 may be utilized to modify the one or more GNSS signals (e.g., amplify and/or adjust the gains), as known by those skilled in the art.

A first subsystem controller 612 of the first subsystem 605 includes processing logic 620 configured to obtain serial data associated with the first subsystem 605 and/or the interfering source. For example, the processing logic 620 may implement one or more known algorithms or techniques to determine the directions to the one or more jammers. In addition, or alternatively, the processing logic 620 may determine a status/health of the first subsystem 605 (e.g., being jammed or not being jammed), etc. For example, the processing logic 620 may determine the power level of the signals received at the antenna 615 and compare the power level to a threshold value. If the power level is greater than or equal to the threshold value, the processing logic 620 may determine that the first subsystem 605 is being interfered with by one or more jamming sources, i.e., that one or more interfering signals are being received at the antenna 615. The memory 630 may store one or more values associated with one or more embodiments described herein. For example, the memory may store the GNSS information, the serial data (e.g., directions to the jammers, received jammer power levels, status/health information, number of nulls, etc.), the power level, the threshold value, etc.

The serial data, obtained by the processing logic 620, may be provided to an RF modulator/de-modulator 635 of the first subsystem controller 612. The RF modulator/de-modulator 635 modulates the serial data onto a RF communication signal to produce a serial RF communication signal that utilizes a frequency that is different than the frequency utilized by the one or more GNSS signals (e.g., 1176-1610 MHz). For example, the RF modulator/de-modulator 130 may modulate the serial data utilizing a frequency of 2.4 GHz to produce the serial RF communication signal.

A splitter/combiner 640, within the first subsystem 605, receives the one or more GNSS signals containing the GNSS information from the LNA/VGA 625 and also receives the serial RF communication signal containing the serial data from the RF modulator/de-modulator 635. The splitter/combiner 640 combines the one or more GNSS signals containing the GNSS information that utilizes a first frequency with the serial RF communication signal containing the serial data utilizing a second frequency to produce a single RF communication signal. As such, the serial RF communication signal is out-of-band from the GNSS signals.

The single RF communication signal, containing the GNSS information and the serial data, travels through a bias-T 645*a* and over the GNSS antenna data link 642 to the second subsystem 610. For example, the GNSS antenna data link 642 may be a single coaxial cable. In addition, the GNSS antenna data link 642 may be unidirectional or bi-directional between the first subsystem 605 and the second subsystem 610. The second subsystem 610 may, for example, be a Power Injector/Data Converter (PIDC).

At the second subsystem 610, the single RF communication signal travels through bias-T 645*b* to splitter/combiner 650 that splits the single RF communication signal into a GNSS RF path and a serial RF path. It is noted that the two bias-Ts, 645*a* and 645*b*, are utilized to provide DC power ($V_{IN}$) from a power source 647 to the first subsystem 605 ($V_{OUT}$) while ensuring that the DC power does not pass through to other downstream/upstream subsystems, as known by those skilled in the art. For example, the power source may be a 12V battery of a vehicle and upconverter 660 of the second subsystem 610 may upconvert the voltage to 36V to lower the current and thus decreasing the power loss over the GNSS antenna data link 642.

The GNSS RF path carries a GNSS split RF signal containing the GNSS information from the splitter/combiner 650 to the GNSS receiver 655 that is external to the second subsystem 610. For example, the GNSS split RF signal may be transmitted from the second subsystem 610 over an RF cable (not shown), one or more wired or wireless networks (not shown), etc. to the GNSS receiver 655. The GNSS receiver 655 may utilize the GNSS information from the GNSS split RF signal to compute the position of the first subsystem 605. The serial RF path carries a serial split RF signal containing the serial data from the splitter/combiner 650 to a RF modulator/de-modulator 665 of a second subsystem controller 667. The RF modulator/de-modulator 665 de-modulates the serial data from the serial split RF signal.

The processing logic 670 may format the serial data according to a protocol utilized to transmit the serial data to the control system 675. The control system may be a PC or a user display/navigation control system. For example, if the control system 675 is communicating with the second subsystem 610 via a USB port, the processing logic 670 may format the serial data into one or more packets according to a specific protocol associated with USB. The serial data may then be transmitted between the control system 675 and the second subsystem 610 over the one or more wired or wireless networks (not shown) and, for example, displayed on a display screen of the control system 675. The memory 680 of the second subsystem 610 may store one or more values associated with one or more embodiments described herein. For example, the memory may store the GNSS information, the serial data, etc.

In an embodiment, and when the GNSS antenna data link 642 is bi-directional, the second subsystem 610 and/or the control system 675 may transmit information (e.g., request information and/or configuration information) to the first subsystem 605 utilizing the GNSS antenna data link 642. For example, the second subsystem 610 and/or control system 675 may send request information requesting that the first subsystem 605 transmit the serial data to the second subsystem 610 and/or control system 675 at one or more particular times. In addition, the second subsystem 610 and/or control system 675 may send configuration information to the first subsystem 605 instructing the first subsystem 605 to perform one or more functions.

Specifically, the request information in requests and/or the configuration information in configuration commands may be modulated by the RF modulator/de-modulator 665 of the second subsystem 610 to respectively produce one or more RF request messages and/or RF configuration messages that are transmitted through the splitter/combiner 650 and bias-T 645b, and over the bi-directional GNSS antenna data line 642 to the first subsystem 605.

At the first subsystem 605, the RF request messages and/or RF configuration messages are transmitted through the bias-T 645a and the splitter/combiner 640 to the first subsystem controller 612. The RF modulator/de-modulator 635 de-modulates the request information and/or configuration information from the RF request messages and/or RF configuration messages.

The processing logic 620 may then utilize the request information and/or configuration information. Specifically, the processing logic may utilize the request information to determine when the serial data should be transmitted to the second subsystem 610 and/or control system 675. For example, the request information may indicate that the serial data should be sent to the control system 675 every one second. As such, the first subsystem 605 may combine the GNSS signals with the serial RF communication signal to produce the single RF communication signal every one second such that the control system 675 receives the serial data every one second. In addition, the configuration information may instruct the first subsystem to perform one or more functions such as, but not limited to, VGA adjustment, signal gain adjustment, and/or turning on/off particular antenna elements.

In addition or alternatively, the GNSS receiver 655 and the control system 675 may communicate over the one or more wired or wireless networks (not shown). For example, the GNSS receiver 655 may determine the position of the first subsystem 605 from the received GNSS information and transmit the position of the first subsystem 605 over the one or more wired or wireless networks (not shown) to the control system 675. The control system 675 may utilize the position of the first subsystem 605 with the received serial data (e.g., directions of the nulls toward the one or more jammers) to determine the position of the one or more jammers. For example, if a jammer is stationary, the control system may utilize the directions of one or more nulls with the positions of the first subsystem 605 over a period of time to determine the location of the stationary jammer. Alternatively, if the jammer is moving, the control system may utilize the direction of one or more nulls from a plurality of first subsystems (not shown) with the positions of the plurality of first subsystems 605 (not shown) to determine the location of the moving jammer.

As such, the control system may then determine the position of the one or more jammers relative to the first subsystem 605. For example, the control system 675 may display the bearing of the one or more jammers relative to the first subsystem 605 on a display screen of the control system 675. Advantageously, a user operating the control system 675 may be able to view the positional relationship between the first subsystem 605 and the jammer.

In response to viewing the positional relationship between the first subsystem 605 and the jammer, the user may operate the control system 675 to send request information and/or configuration information to the first subsystem 605 in the manner described above. For example, the control system 675 may send one or more configuration commands to the first subsystem 605 instructing the first subsystem 605 to stop implementing its anti-jamming technique if the positional relation indicates that the first subsystem 605 is a threshold distance away from the jammer and thus not being negatively impacted by the jammer. As such, the configuration commands would be sent over the one or more wired or wireless networks (not shown) to the second subsystem 610, and then to the first subsystem 605 utilizing the GNSS antenna data link 642 in the manner described above.

Figure 7:
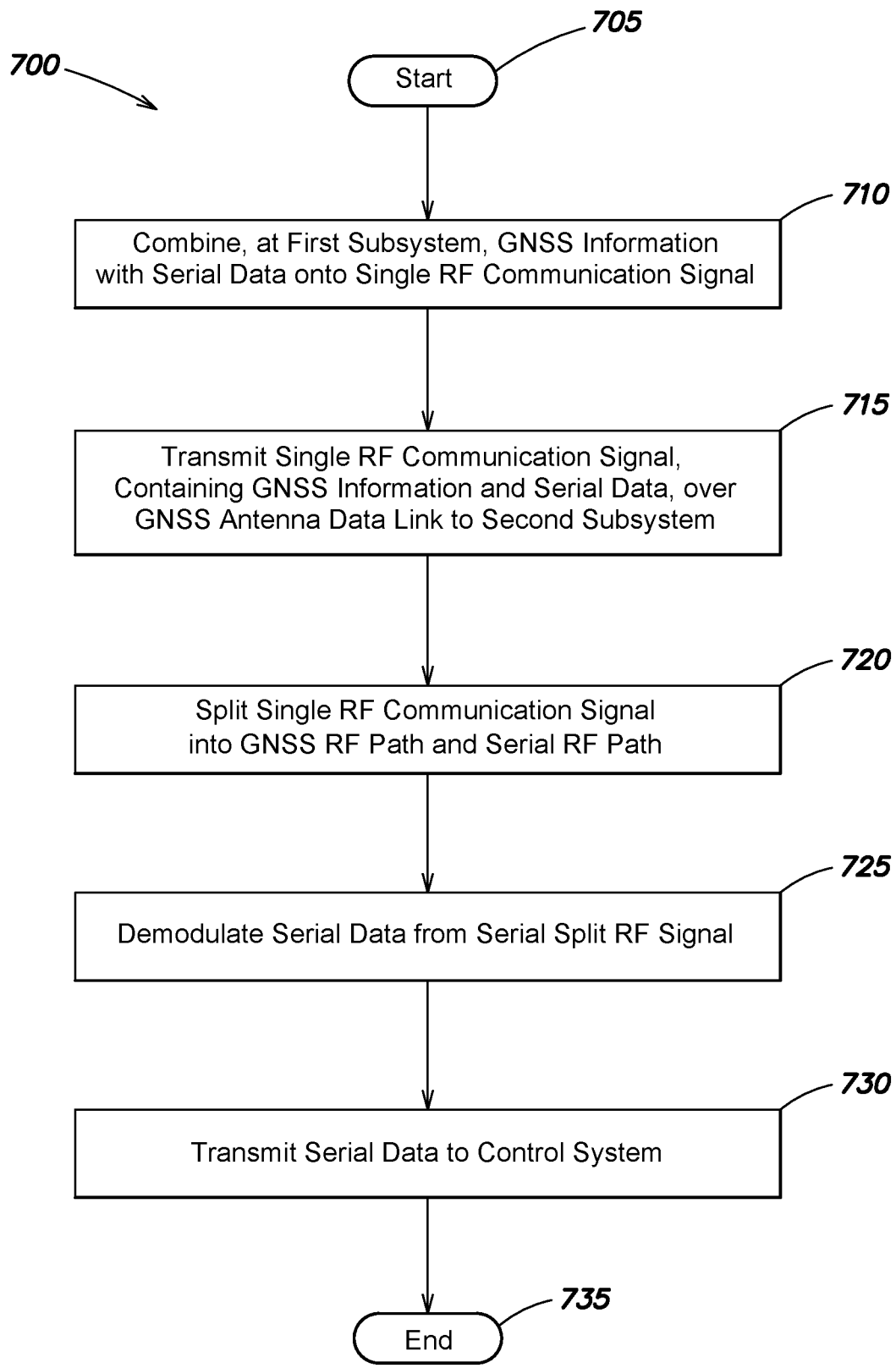
FIG. 7 is an exemplary flow chart for transmitting GNSS information and serial data between two subsystems utilizing the GNSS antenna data link in accordance with an illustrative embodiment of the invention.

FIG. 7 is an exemplary flow chart for transmitting GNSS information and serial data between two subsystems utilizing the GNSS antenna data link in accordance with an illustrative embodiment of the invention. The procedure 700 starts at step 705 and continues to step 710 where the first subsystem combines GNSS information with serial data onto a single RF communication signal, wherein the serial data is out-of-band from the GNSS information. Specifically, the first subsystem may be an anti-jamming antenna subsystem and may include an antenna configured to mitigate interferences and obtain the GNSS information from one or more GNSS signals received at the antenna. In addition, the processing logic 620 of the first subsystem 605 may obtain serial data such as, but not limited to, the directions to one or more jammers, status/health information of the first subsystem 605, number of nulls directed to the one or more jammers, etc.

The serial data may be modulated onto a RF communication signal by the RF modulator/de-modulator 635 of the first subsystem controller 612 to produce a serial RF communication signal. The serial RF communication signal containing the serial data may then be combined, utilizing the splitter/combiner 640, with the GNSS signals containing the GNSS information to produce the single RF communication signal, wherein the serial RF communication signal is out-of-band-from the GNSS signals.

The procedure continues to step 715 where the single RF communication signal, containing the serial data and the GNSS information, is transmitted over the GNSS antenna data link to the second subsystem. For example, the GNSS antenna data link 642 may be a single coaxial cable and may be unidirectional or bi-directional. Specifically, the single RF communication signal is transmitted through the bias-T 645a, over the GNSS antenna data link 642, to the second subsystem 610. At the second subsystem 610, the single RF communication signal is transmitted through the bias-T 645b and to the splitter 650.

The procedure continues to step 720 where the splitter 650 splits the single RF communication signal into a GNSS RF path and a serial RF path. Specifically, the GNSS RF path carries a GNSS split RF signal containing the GNSS information from the splitter 650 over an RF cable, one or more wired or wireless networks (not shown), etc., to the GNSS receiver 655. The GNSS receiver 655 may utilize the GNSS information to compute the position of the first subsystem 605 in a known manner. The serial RF path carries a serial split RF signal containing the serial data from the splitter 650 to the RF modulator/de-modulator 665 of the second subsystem controller 667. The procedure continues to step 725 where the serial data is demodulated from the serial split RF signal. Specifically, the RF modulator/de-modulator 665 demodulates the serial data from the serial split RF signal. The processing logic 670 of the second subsystem controller 667 may format the serial data according to a protocol utilized by the second subsystem 605 and control system 675 to communicate.

The procedure continues to step 730 where the serial data is transmitted to a control system. Specifically, the serial data may be transmitted between the second subsystem 610 and control system 675 over the one or more wired or wireless networks (not shown). The control system may then utilize the serial data in any of a variety of different ways. For example, the serial data (e.g., directions to the one or more jammers, received jammer power levels, the status/health of the first subsystem 605, the number of nulls, etc.) may be displayed on a display screen of the control system 675. In addition or alternatively, the control system 675 may receive over the one or more wired or wireless networks (not shown) and from the GNSS receiver 655 the location of the first subsystem 605 determined from the GNSS information. The control system 675 may then utilize the location of the first subsystem 605 with the serial data (e.g., directions to the one or more jammers). For example, the control system 675 may display the positional relationship (e.g., bearing) between the first subsystem 605 and one or more stationary or moving jammers. The procedure then ends at step 735.

Thus, the existing single GNSS antenna data link (e.g., cable) between the first subsystem 605 and the second subsystem 610 that is utilized to transmit GNSS information between the two subsystems may also be utilized to transmit additional different data (e.g., serial data) between the two subsystems. Advantageously, additional holes do not need to be drilled in the armor or skin of the vehicle to accommodate additional cables that would otherwise be required to transmit the additional data between the two subsystems.

Figure 8:
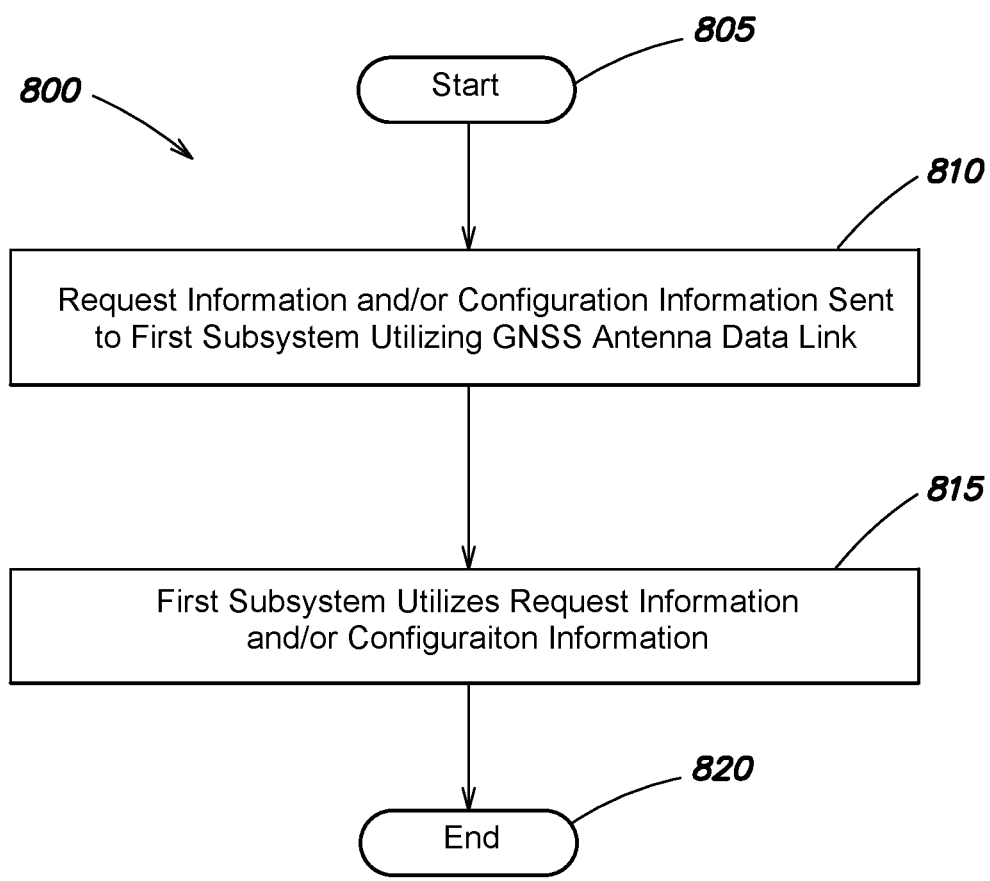
FIG. 8 is an exemplary flow chart for transmitting request information and/or configuration information between two subsystems utilizing the GNSS antenna data link in accordance with an illustrative embodiment of the invention.

FIG. 8 is an exemplary flow chart for transmitting request information and/or configuration information between two subsystems utilizing the GNSS antenna data link in accordance with an illustrative embodiment of the invention. The procedure 800 starts at step 805 and continues to step 810 where request information and/or configuration information is sent to a first subsystem utilizing a GNSS antenna data link 642. For example, the second subsystem 610 and/or the control system 675 may send the request information and/or configuration information to the first subsystem utilizing the GNSS antenna data link.

Specifically, the request information may request that the first subsystem 605 transmit the serial data to the second subsystem 610 and/or control system 675 at one or more particular times. For example, the second subsystem 610 and/or control system 675 may want to receive the serial data (e.g., direction to the one or more jammers, received jammer power levels, the status/health of the first subsystem 605, the number of nulls, etc.) at predetermined time intervals (e.g., every one second). Further, the configuration information may instruct the first subsystem 605 to perform one or more functions such as, but not limited to, VGA adjustment, signal gain adjustment, and/or turning on/off particular antenna elements.

For example, a user of the control system 675 may utilize an input device (e.g., keyboard and/or mouse) associated with the control system 675 to input the request information and/or configuration information. One or more requests and/or configuration commands may be sent from the control system 675 over the one or more wired or wireless networks (not shown) to the second subsystem 610. At the second subsystem 610, the RF modulator/de-modulator 665 of the second subsystem controller 667 modulates the requests and/or configuration commands to produce one or more RF request messages and/or one or more RF configuration messages. The one or more RF request messages and/or the one or more RF configuration messages are transmitted via the serial RF path through the splitter/combiner 650 and bias-T 645b over the GNSS antenna data link 642 to the first subsystem 605.

The procedure continues to step 815 where the first subsystem utilizes the request information from the RF request messages and/or the configuration information from the RF configuration messages. For example, the first subsystem 605 may utilize the request information to determine when the serial data is to be transmitted from the first subsystem 605 to the second subsystem 610 and/or control system 675. In addition or alternatively, the command information may be utilized by the first subsystem 605 to perform one or more functions (e.g., turn on/off particular antenna elements). Specifically the RF request messages and/or RF configuration messages are transmitted through the bias-T 645a and splitter/combiner 640 to RF modulator/de-modulator 635 of the first subsystem controller 612. The RF modulator/de-modulator 635 demodulates the request information and/or configuration information from the RF request messages and/or RF configuration messages. The first subsystem 605 may then utilize the request information and/or configuration information.

For example, the control system 675 may send one or more request messages to the first subsystem 605 requesting that the first subsystem 605 send the serial data (e.g., direction to the one or more jammers, received jammer power levels, the status/health of the first subsystem, the number of nulls, etc.) to the control system 675 every one second. As such, the first subsystem 605 may combine the GNSS signals with the serial RF communication signal to produce the single RF communication signal every one second such that the control system 675 receives the serial data every one second. The procedure then ends at step 820.

Figure 9:
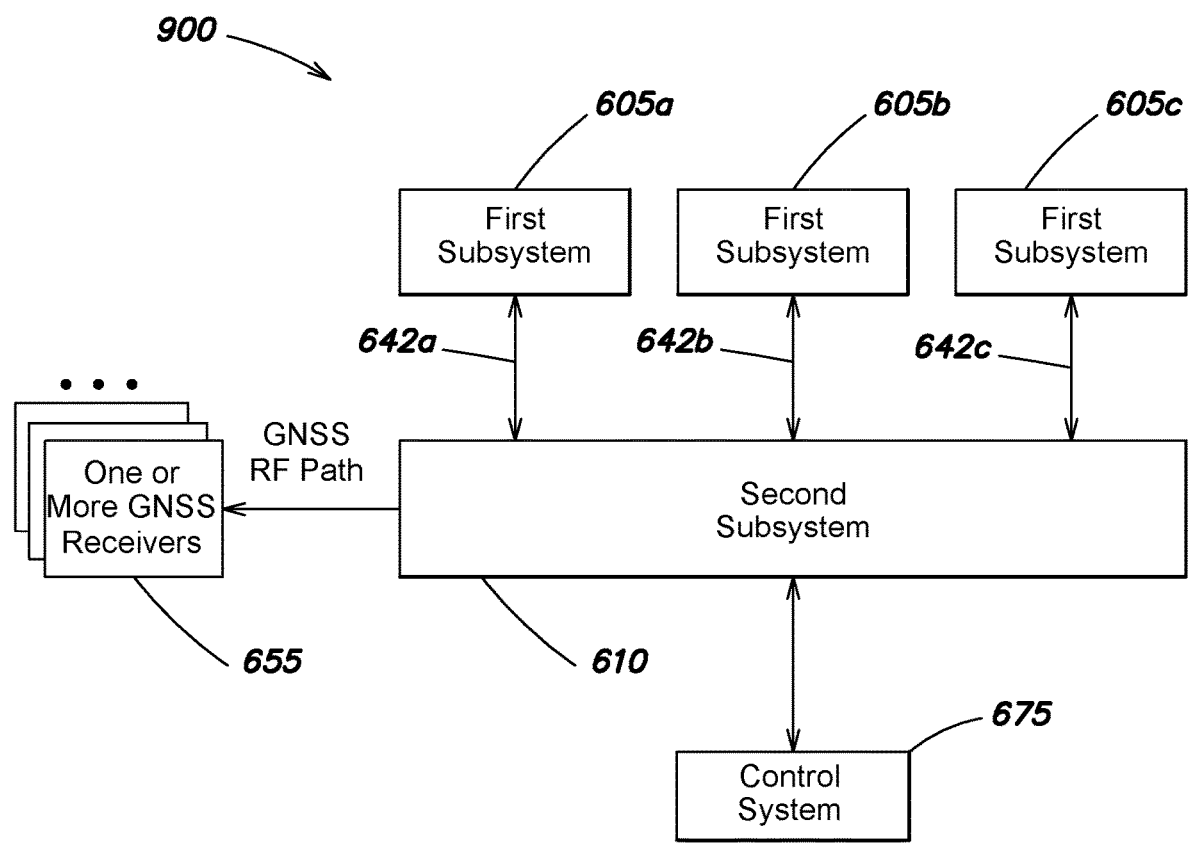
FIG. 9 depicts a system with a plurality of GNSS antenna data links that are utilized to transmit GNSS information and serial data between a plurality of subsystems in accordance with an illustrative embodiment of the invention.

Referring to FIG. 9, a system 900 includes a plurality of first subsystems 605a, 605b, and 605c. For example, the plurality of first subsystems may be anti-jamming antenna subsystems as described above with reference to FIGS. 6A and 6B. In addition, system 900 includes a second subsystem 610 that, for example, may be a PIDC as described above with reference to FIGS. 6A and 6B. As described above with reference to FIGS. 6A and 6B, a single RF communication signal, containing the GNSS information and the serial data, from each first subsystem (e.g., 605a, 605b, and 605c) may be transmitted over respective GNSS antenna data links 642a, 642b, and 642c, to the second subsystem 610.

The GNSS RF path carries a GNSS split RF signal containing the GNSS information from each of the plurality of first subsystems (e.g., 605a, 605b, and 605c) to one or more GNSS receivers 655 that are external to the second subsystem 610. For example, a GNSS split RF signal may be transmitted for each of the plurality of first subsystems (e.g., 605a, 605b, and 605c) from the second subsystem 610 over an RF cable (not shown), one or more wired or wireless networks (not shown), etc. to the one or more GNSS receivers 655. The one or more GNSS receivers 655 may utilize the GNSS information from the GNSS split RF signals to compute the position of the each of the first subsystems 605a, 605b, and 605c and/or system attitude information (e.g., roll, pitch, and heading). For example, a different GNSS receiver of the one or more GNSS receivers 655 may compute the position and/or system attitude information for a different one of the plurality of first subsystems 655. Alternatively, a single GNSS receiver of the one or more GNSS receivers 655 may include a plurality of inputs such that the single GNSS receiver may compute position and/or system attitude information for any number of the plurality of different first subsystems 655.

The serial RF path carries a serial split RF signal containing the serial data from each of the plurality of first subsystems (e.g., 605a, 605b, and 605c) such that the serial data from each of the plurality of first subsystems (e.g., 605a, 605b, and 605c) may be transmitted to the control system in the manner described above with reference to FIGS. 6A and 6B.

The control system 675 may utilize the serial data (e.g., the directions to one or more jammers, status/health information of the plurality of first subsystems 605a, 605b, and 605c, number of nulls directed to the one or more jammers, etc.) from the plurality of first subsystems (e.g., 605a, 605b, and 605c) to determine the location of the jammer. For example, the direction information associated with one or more jammers and received jammer power levels that are received from each of the plurality of first subsystems (e.g., 605a, 605b, and 605c) may be utilized by the control system 675 to calculate the direction and distance to the jammer.

The control system 675 may then display the bearing of the one or more jammers relative to the plurality of first subsystems 605a, 605b, and 605c on a display screen of the control system 675. Advantageously, a user operating the control system 675 may be able to view the positional relationship between the first subsystems and the jammer.

Figure 10:
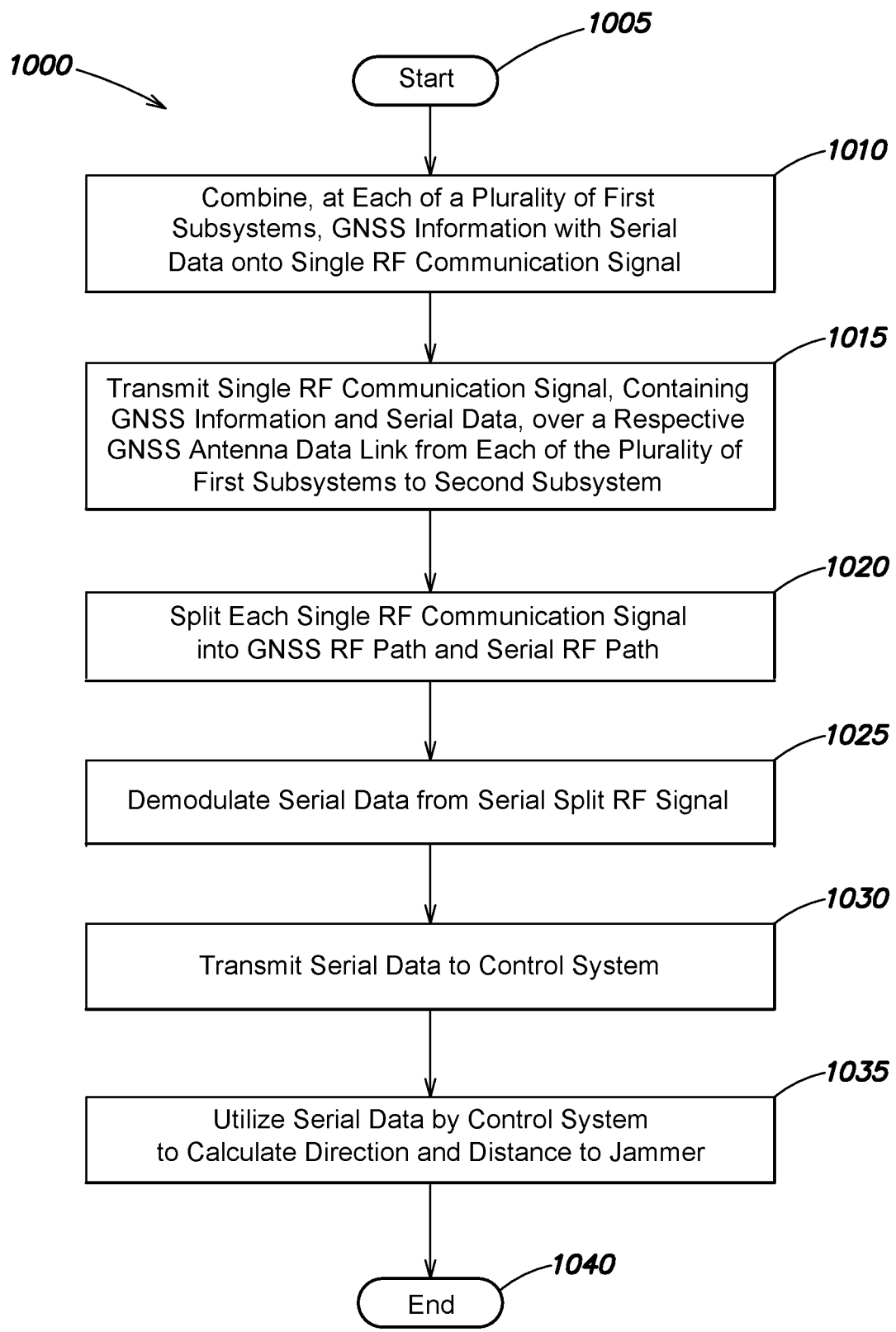
FIG. 10 is an exemplary flow chart for transmitting GNSS information and serial data between the plurality of subsystems utilizing the plurality of GNSS antenna data links in accordance with an illustrative embodiment of the invention.

FIG. 10 is an exemplary flow chart for transmitting GNSS information and serial data between the plurality of subsystems utilizing the plurality of GNSS antenna data links in accordance with an illustrative embodiment of the invention. The procedure 1000 starts at step 1005 and continues to step 1010 where GNSS information is combined with serial data onto a single RF communication signal for each of a plurality of first subsystems as depicted in FIG. 9, wherein the serial data is out-of-band from the GNSS information. Specifically, each of the plurality of first subsystems may be a different anti-jamming antenna subsystem and may include an antenna configured to mitigate interferences and obtain the GNSS information from one or more GNSS signals received at the antenna. In addition, the processing logic 620 of each of the plurality of first subsystems 605a, 605b, and 605c, may obtain serial data such as, but not limited to, the directions to one or more jammers, status/health information of the first subsystem 605, number of nulls directed to the one or more jammers, etc.

The serial data may be modulated onto a RF communication signal by the RF modulator/de-modulator 635 of each of the plurality of first subsystems 605a, 605b, and 605c, to produce respective serial RF communication signals. The serial RF communication signal containing the serial data may then be combined, utilizing the splitter/combiner 640 of each of the plurality of first subsystems 605a, 605b, and 605c, with the GNSS signals containing the GNSS information to produce a single RF communication signal for each of the plurality of first subsystems (e.g., 605a, 605b, and 605c), wherein the serial RF communication signal is out-of-band-from the GNSS signals.

The procedure continues to step 1015 where the single RF communication signal, containing the serial data and the GNSS information, is transmitted over respective GNSS antenna data links (e.g., 642a, 642b, and 642c) from each of the plurality of first subsystems to the second subsystem. For example, each of the GNSS antenna data links (e.g., 642a, 642b, and 642c) may be a single coaxial cable and may be unidirectional or bi-directional. Specifically, each of the single RF communication signals is transmitted through the bias-T 645a of each of the plurality of first subsystems, over the respective GNSS antenna data links (e.g., 642a, 642b, and 642c), to the second subsystem 610. At the second subsystem 610, each of the single RF communication signals are transmitted through the bias-T 645b and to the splitter 650.

The procedure continues to step 1020 where the splitter 650 splits each of the single RF communication signals into a GNSS RF path and a serial RF path. Specifically, the GNSS RF path carries respective GNSS split RF signals for each of the plurality of first subsystems that contains the GNSS information from the splitter 650 over an RF cable, one or more wired or wireless networks (not shown), etc., to the one or more GNSS receivers 655. The one or more GNSS receivers 655 may utilize the GNSS information for each of the GNSS split RF signals to compute the position and/or system attitude information (e.g., roll, pitch, and heading) for each of the plurality of first subsystems (e.g., 605a, 605b, and 605c) in a known manner. The serial RF path carries a serial split RF signal for each of the plurality of first subsystems that contains the serial data from the splitter 650 to the RF modulator/de-modulator 665 of the second subsystem controller 667.

The procedure continues to step 1025 where the serial data is demodulated from each of the serial split RF signals for each of the plurality of first subsystems (e.g., 605a, 605b, and 605c). Specifically, the RF modulator/de-modulator 665 demodulates the serial data from each of the serial split RF signals. The processing logic 670 of the second subsystem controller 667 may format the serial data from each of the serial split RF signals according to a protocol utilized by the second subsystem 605 and control system 675 to communicate.

The procedure continues to step 1030 where the serial data from each of the serial spit RF signals is transmitted to a control system. Specifically, the serial data from each of the serial RF signals may be transmitted between the second subsystem 610 and control system 675 over the one or more wired or wireless networks (not shown). The control system may then utilize the serial data in any of a variety of different ways. For example, the serial data (e.g., directions to the one or more jammers, received jammer power levels, the status/health of the plurality of first subsystems 605a, 605b, and 605c, the number of nulls, etc.) may be displayed on a display screen of the control system 675.

The procedure continues to step 1035 where the control system utilizes the serial data from each of the plurality of first subsystems to calculate the direction and distance to a jammer. For example, the direction information associated with one or more jammers and received jammer power levels that are received from each of the plurality of first subsystems (e.g., 605a, 605b, and 605c) may be utilized by the control system 675 to calculate the direction and distance to the jammer. The control system 675 may then display the bearing of the one or more jammers relative to the plurality of first subsystems 605a, 605b, and 605c on a display screen of the control system 675. For example, the control system 675 may receive the positions of the plurality of first subsystems 605a, 605b, and 605c from the one or more GNSS receivers 655. The control system 675 may then utilize the received position information with the calculated direction and distance to the jammer to display the bearing of the one or more jammers relative to the plurality of first subsystems 605a, 605b, and 605c. Advantageously, a user operating the control system 675 may be able to view the positional relationship between the first subsystems and the jammer. The procedure ends at step 1040.

The foregoing description described certain example embodiments. It will be apparent, however, that other variations and modifications may be made to the described embodiments, with the attainment of some or all of their advantages. For example, although FIG. 2A include two sensors 120 and 122, it is expressly contemplated that any number of sensors may be utilized such that the sensor data from each of the sensors is combined with the GNSS information from the GNSS signals to produce a single RF communication signal that is transmitted over the GNSS antenna data link to the receiver side. In addition, although FIGS. 1A and 2A depict the antenna side controller and the receiver side respectively including a RF modulator/demodulator, it is expressly contemplated that the RF modulator/demodulator may be separate components from the antenna side controller and the receiver side controller. Moreover, although reference is made to transmitting GNSS information with sensor/serial data, it is expressly contemplated that the GNSS information may be transmitted with other data associated with one or more other radio signals (e.g., SiriusXM®).

Further, although reference is made to the first subsystem being an anti-jamming antenna subsystem and the second subsystem being a PIDC, it expressly contemplated that the first subsystem may be a first PIDC and the second subsystem may be a second PIDC. Alternatively, the first subsystem may be a first antenna subsystem and the second subsystem may be a second antenna subsystem. As such, the GNSS information may be transmitted with the serial data from the first antenna subsystem to the second antenna subsystem utilizing the GNSS antenna data link in the manner described above, and the second antenna subsystem may utilize processing logic to compute position for the first antenna subsystem while also computing position for the second antenna subsystem.

Alternatively, the second antenna subsystem may receive the GNSS information and serial data. The second subsystem may then combine the GNSS information from the first antenna subsystem, the serial data from the first antenna subsystem, and the GNSS information associated with the second antenna subsystem onto a single RF communication signal, in the manner described above. The GNSS information from the first antenna subsystem and the serial data are out-of-band from the GNSS information associated with the second antenna subsystem. The single RF communication signal is then transmitted over a different GNSS antenna data link to a GNSS receiver that computes position for the first antenna subsystem and the second antenna subsystem. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system comprising:
an anti-jamming antenna subsystem configured to maintain Global Navigation Satellite System (GNSS) information and serial data associated with one or more jamming signals produced by one or more jammers;
a combiner, of the anti-jamming antenna subsystem, configured to combine the GNSS information and the serial data onto a single radio frequency (RF) communication signal, wherein the serial data is out-of-band from the GNSS information; and
a data link between the anti-jamming antenna subsystem and a second subsystem, the data link configured to transmit the single RF communication signal, containing the GNSS information and the serial data, to the second subsystem.

2. The system of claim 1, wherein the anti-jamming antenna subsystem includes a Controlled Reception Pattern Antenna (CRPA) coupled to an exterior of a vehicle and configured to mitigate the one or more jamming signals produced by the one or more jammers, and the second subsystem is a Power Injector/Data Converter (PIDC) located inside the vehicle.

3. The system of claim 1, further comprising:
a control system configured to:
receive the serial data from the second subsystem over a period of time,
receive a location of the anti-jamming antenna subsystem from a GNSS receiver over the period of time, and
determine a position of the one or more jammers relative to the anti-jamming antenna subsystem utilizing the serial data with the location of the anti-jamming antenna subsystem received over the period of time.

4. The system of claim 1, wherein the anti-jamming antenna subsystem is configured to house a first subsystem controller including an RF modulator configured to create a serial RF communication signal containing the serial data, and wherein the combiner is further configured to combine the serial RF communication signal containing the serial data with GNSS signals containing the GNSS information to produce the single RF communication signal, wherein the serial RF communication signal is out-of-band-from the GNSS signals.

5. The system of claim 1, wherein the serial data includes a direction to the one or more jammers producing the one or more jamming signals received at the anti-jamming antenna subsystem, and the serial data further includes at least one of received jammer power levels, status information indicating whether the anti-jamming antenna subsystem is being interfered with by the one or more jammers, and a number of nulls directed to the one or more jammers.

6. The system of claim 1, wherein a splitter within the second subsystem is configured to split the single RF communication signal, received from the anti-jamming antenna subsystem and over the data link, into a GNSS split RF signal containing the GNSS information and a serial split RF signal containing the serial data.

7. The system of claim 6, wherein a RF de-modulator within the second subsystem is configured to extract the serial data from the serial split RF signal.

8. The system of claim 3, wherein the second subsystem is configured to transmit the serial data to the control system over one or more computer networks.

9. The system of claim 1, wherein at least one of request information and configuration information is transmitted from the second subsystem to the anti-jamming antenna subsystem utilizing the data link.

10. A method, comprising:
receiving, at a Controlled Radiation Pattern Antenna (CRPA) of an anti-jamming antenna subsystem, one or more Global Navigation Satellite System (GNSS) signals;
directing, by the CRPA of the anti-jamming antenna subsystem, one or more nulls in one or more directions of one or more jammers producing one or more jamming signals;
combining, at the anti-jamming antenna subsystem, serial data associated with the one or more jamming signals produced by the one or more jammers and GNSS information associated with the one or more GNSS signals onto a single radio frequency (RF) communication signal, wherein the serial data is out-of-band from the GNSS information; and
transmitting, over a single data link between the anti-jamming antenna subsystem and a second subsystem, the single RF communication signal, containing the GNSS information and the serial data, to the second subsystem.

11. The method of claim 10, wherein the anti-jamming antenna subsystem is coupled to an exterior of a vehicle and the second subsystem is a Power Injector/Data Converter (PIDC) located inside the vehicle.

12. The method of claim 10, further comprising:
receiving, at a control system, the serial data from the second subsystem over a period of time;
receiving, at the control system, a location of the anti-jamming antenna subsystem from a GNSS receiver over the period of time; and
determining, by the control system, a position of the one or more jammers relative to the anti-jamming antenna subsystem utilizing the serial data with the location of the anti-jamming antenna subsystem received over the period of time.

13. The method of claim 10, wherein the serial data includes at the one or more directions of the one or more nulls directed to the one or more jammers, and the serial data further includes at least one of received jammer power levels, status information indicating whether the anti-jamming antenna subsystem is being interfered with by the one or more jammers, and a number of the nulls directed to the one or more jammers.

14. The method of claim 10, further comprising:
modulating, by an RF modulator within the anti-jamming antenna subsystem, the serial data onto a serial RF communication signal; and
combining, by a combiner within the anti-jamming antenna subsystem, the serial RF communication signal containing the serial data with the one or more GNSS signals containing the GNSS information to produce the single RF communication signal, wherein the serial RF communication signal is out-of-band from the one or more GNSS signals.

15. The method of claim 10, further comprising splitting, at the second subsystem, the single RF communication signal into a GNSS split RF signal containing the GNSS information and a serial split RF signal containing the serial data.

16. The method of claim 15, further comprising de-modulating, at the second subsystem, the serial split RF signal to extract the serial data.

17. The method of claim 16, further comprising transmitting the serial data, extracted from the serial split RF signal, to a control system over one or more computer networks.

18. The method of claim 10, further comprising transmitting at least one of request information and configuration information from the second subsystem to the anti-jamming antenna subsystem utilizing the data link.

19. A system comprising:
an anti-jamming antenna subsystem including a Global navigation satellite system (GNSS) antenna configured to receive one or more GNSS signals containing GNSS information and configured to mitigate one or more interferences from one or more jamming sources, the anti-jamming antenna subsystem configured to obtain serial data associated with the one or more jamming sources;
a combiner, within the anti-jamming antenna subsystem, configured to combine a serial radio frequency (RF) communication signal containing the serial data with the one or more GNSS signals containing the GNSS information to produce a single RF communication signal, wherein the serial RF communication signal is out-of-band from the one or more GNSS signals; and
a GNSS antenna data link between the anti-jamming antenna subsystem and a subsystem, the GNSS antenna data link configured to transmit the single RF communication signal, containing the serial data and the GNSS information, to the subsystem.

20. The system of claim 19, further comprising:
a control system configured to
receive the serial data over a period of time from the subsystem that is a Power Injector/Data Converter (PIDC),
receive a location of the anti-jamming antenna subsystem over the period of time from an external source, and
determine a position of the one or more jamming sources relative to the anti-jamming antenna subsystem utilizing the serial data with the location of the anti-jamming antenna subsystem received over the period of time.

* * * * *